United States Patent

Ueta

[11] Patent Number: 5,951,021
[45] Date of Patent: Sep. 14, 1999

[54] METALLIC GASKET

[75] Inventor: Kosaku Ueta, Kumagaya, Japan

[73] Assignee: Japan Metal Gasket Co., Ltd., Japan

[21] Appl. No.: 08/533,271

[22] Filed: Sep. 25, 1995

[30] Foreign Application Priority Data

Nov. 22, 1994 [JP] Japan .................................. 6-288106
Mar. 3, 1995 [JP] Japan .................................. 7-043922
Jul. 7, 1995 [JP] Japan .................................. 7-171852

[51] Int. Cl.$^6$ .............................. F16J 15/06; F16J 15/10
[52] U.S. Cl. ......................... 277/593; 277/594; 277/596
[58] Field of Search ...................................... 277/591, 592, 277/593, 594, 596, 639; 123/41.74, 193.3

[56] References Cited

U.S. PATENT DOCUMENTS

| | | | |
|---|---|---|---|
| 3,352,564 | 11/1967 | Johnson | 277/593 |
| 3,817,540 | 6/1974 | Nicholson . | |
| 4,428,593 | 1/1984 | Pearlstein . | |
| 4,516,784 | 5/1985 | Merz | 277/639 |
| 4,600,201 | 7/1986 | Lönne et al. . | |
| 4,620,710 | 11/1986 | Lambert et al. . | |
| 4,834,399 | 5/1989 | Udagawa et al. | 277/592 |
| 5,082,298 | 1/1992 | Uchida et al. . | |
| 5,131,668 | 7/1992 | Uchida . | |
| 5,161,498 | 11/1992 | Miyaoh | 123/193.3 |
| 5,240,262 | 8/1993 | Udagawa et al. . | |
| 5,294,134 | 3/1994 | Kawaguchi et al. . | |
| 5,368,315 | 11/1994 | Viksne . | |

FOREIGN PATENT DOCUMENTS

| | | |
|---|---|---|
| 0086727 | 1/1983 | European Pat. Off. ......... F02F 11/00 |
| 0523946A1 | 7/1992 | European Pat. Off. . |
| 2424455 | 4/1979 | France . |
| 1919873 | 4/1969 | Germany . |
| 6101761 | 9/1992 | Japan .............................. F16J 15/08 |

OTHER PUBLICATIONS

European Search Report Listing the Four Above–Listed Patent Documents.

*Primary Examiner*—Anthony Knight
*Assistant Examiner*—John L. Beres
*Attorney, Agent, or Firm*—Young & Basile, P.C.

[57] ABSTRACT

An edge of a cylinder bore hole of a base plate is folded back on the base plate to form a double-layer folded portion, and a soft member is held in the inside of the folded portion. Folded portions are also formed by folding an outer peripheral edge of the base plate at positions along a straight line which passes through center points of bolt holes which are located at each side of a reference line passing through center points of cylinder bore holes. The straight line is parallel with the reference line. Further folded portions are formed by folding the outer peripheral edge of the base plate at positions along a further straight line which passes through center points of bolt holes which are located at both sides of the reference line so that the further straight line is orthogonal to the the reference line. Rubber beads made of silicon rubber are formed on both joining surfaces of the base plate to bound each of the cylinder bore holes and the bolt holes.

5 Claims, 10 Drawing Sheets

METALLIC GASKET

BACKGROUND OF THE INVENTION

1. Field of the Invention

The present invention relates to a metallic gasket which is interposed between joining surfaces of a cylinder block and a cylinder head of an internal combustion engine, and which prevents leakage of fluid such as combustion gas, cooling water, lubricating oil, and the like.

2. Description of the Prior Art

Generally, a gasket of various kinds is interposed between joining surfaces of a cylinder block and a cylinder head constituting an automobile engine such as an internal combustion engine to prevent leakage of fluid such as combustion gas, cooling water, lubricating oil, and the like, and the sealing function is achieved by tightening both the cylinder block and the cylinder head by tightening members such as bolts or the like. In the prior art, as such a gasket, the so-called soft gasket is provided which is formed of an asbestos material, a chemical fiber material, a carbon sheet material, or the like. However, the soft gasket involves a drawback as an unavoidable problem due to its material that there is a deterioration with time due to the operation of the internal combustion engine, and that it is difficult to ensure a heat resistance. As a result, it is well known that recently, metallic gaskets are widely used, which are excellent in heat resistance, compressive resistance, and durability, and which provide satisfactory restoration properties (spring characteristics) and thermal conductivity.

Here, recently, in order to achieve further high performance of the engine, the developments have been progressed to make the engine small in size and light in weight, to generate high output, to reduce fuel consumption, and the like. For example, to achieve these objectives in the developments, there is a trend in which an aluminum alloy is used for components of the engine, and an interval between adjacent cylinder bores in the cylinder block is made as small as possible.

On the other hand, when the engine components are manufactured by using the aluminum alloy, as easily presumed, the overall rigidity is significantly reduced as compared with the case in which, for example, the engine components are manufactured by using cast iron. Furthermore, as a new drawback caused by making the engine small in size and light in weight, there is an increase in the amount of heat retained by the engine, which heat is generated due to the operation of the engine. To cope with this increase in the amount of heat retained by the engine, a cooling water path is expanded, or the like, however, the overall rigidity of the engine is further decreased. Furthermore, the cooling water path is formed in the vicinity of the cylinder bores to improve the cooling efficiently, however, due to this, the tightening positions of bolts or the like which tighten the cylinder block and cylinder head are located at positions remote from the cylinder bores. Thus, naturally, it is inevitable that the tightening force is large at positions near the bolts, and conversely, the tightening force is small at positions remote from the bolts.

When the overall rigidity of the engine is reduced, and a deviation in the tightening force by tightening members such as the bolts is increased, in a metallic gasket interposed between joining surfaces of the cylinder block and cylinder head, a gap is produced between the metallic gasket and the cylinder block, or between the metallic gasket and the cylinder head at circumferential edge portions of a cylinder bore hole formed corresponding to the cylinder bore. When such a phenomenon occurs, since a surface pressure is unbalanced at a peripheral portion of the cylinder bore hole, the roundness of the cylinder bore hole is degraded, and in addition, the deformation of the cylinder is increased due to differences in the thermal conductance at various portions from the cylinder block to the cylinder head during operation of the engine. Furthermore, when the above-mentioned gap is produced, since the joining surface side of the metallic gasket is directly exposed to combustion gas, drawbacks are caused in which the life of the metallic gasket is reduced, and it becomes impossible to ensure the sealing property for a long time.

For example, as shown in FIG. 20, in a metallic gasket 1 known in the art, a base plate 2 made of metal has a cylinder bore hole 3 formed therein, and a ring 4 obtained by forming a wire material in an annular shape is placed along an inner peripheral edge of the cylinder bore hole 3, and the ring 4 is fixed at its position by holding the ring 4 by a folded inner elastic metallic plate 5 which sandwiches an edge portion of the base plate 2, and furthermore, the inner elastic metallic plate 5 is covered and sandwiched by an outer elastic metallic plate 6. On the other hand, an outer peripheral end portion of the base plate 2 is sandwiched by another elastic metallic plate 7 different from the inner and outer elastic metallic plates 5 and 6. The elastic metallic plate 7 is welded to the base plate 2, for example, by spot welding. Moreover, the base plate 2 is formed with rubber beads 8 of silicon or the like around bolt holes, oil holes, water holes, and the like, and along the outer periphery of the base plate 2.

In such a metallic gasket 1, to cope with the above-mentioned reduction of the overall rigidity of the engine and the deviation in the tightening forces by the tightening members such as bolts or the like, the amount of collapse of the ring 4 and the amount of deformation of the rubber beads 8 are made different from each other, and at the same time, the amount of collapse of the ring 4 is restricted by selecting the thicknesses of the inner and outer elastic metallic plates 5 and 6, so as to ensure effective sealing at any position of the metallic gasket 1, and the tightening forces are made uniform by the elastic metallic plate 7 at the outer peripheral portion of the base plate 2 to suppress the overall deformation of the metallic gasket 1.

However, although it is true that the metallic gasket 1 as shown in FIG. 20 is expected to ensure sufficient sealing and to suppress the deformation, the base plate 2 and each of the elastic metallic plates 5, 6 and 7 are required to be formed as separate members, and also, at the time of manufacturing, the mounting of each of the elastic metallic plates 5, 6 and 7 to the base plate 2 must be made separately. As a result, the cost is inevitably increased, and the metallic gasket 1 becomes expensive. Moreover, in the metallic gasket 1, since only the metallic members such as the ring 4, inner and outer elastic metallic plates 5, and 6 are disposed around the cylinder bore, it is impossible to relieve the reduction of the overall rigidity of the engine and to absorb the deviation in the tightening forces of the bolts. Accordingly, there is a drawback that it becomes difficult to ensure the roundness of the cylinder bore.

Furthermore, in a metallic gasket shown in Japanese Patent Laid-Open Publication No. Hei 6-101761, in order to ensure high gas sealing, a grommet is mounted on a peripheral portion of a bolt hole, or the peripheral portion (a seal portion of the bolt hole) is made thicker than the other portions by folding back a portion of a base plate corresponding to the peripheral portion, and at the same time, the grommet is also mounted on a peripheral portion of a cylinder bore hole, or a portion of the base plate corresponding to the peripheral portion is folded back, and a restoring elastic member is inserted between the grommet and the base plate or between the folded portion and the base plate (a seal portion of the cylinder bore hole). Furthermore, a rubber baked seal line portion is formed between the bolt hole seal portion and the cylinder bore hole seal portion to seal water and oil.

However, in this case, at the time of tightening the bolts, for the inside area of the positions of the bolt holes, it is necessary to apply a load to deform the rubber baked seal line portion and a load to deform the restoring elastic member of the cylinder hole seal portion by the cylinder head. However, the rigidity of the cylinder head formed of an aluminum alloy required for a small and light engine is low, and a sufficient load is not applied. As a result, a portion between bolt holes of the cylinder head is deflected to form a convex surface curving upwardly. In particular, a large deflection is produced at a portion adjacent to the cylinder bore.

As mentioned above, when the large deflection is produced at the portion between the bolt holes adjacent to the cylinder bore of the cylinder head, it is difficult to seal a high temperature, high pressure combustion gas which is generated during operation of the engine. As a result, in the prior art metallic gaskets, such countermeasures have been adopted in which the thickness of the restoring elastic member at the cylinder bore hole seal portion is made larger as a whole, and a shim plate is partially inserted between adjacent cylinder bore holes to increase a surface pressure around the cylinder bore hole.

However, in these countermeasures, since the deformation of the cylinder head, that is, the deflection at the portion between the bolt holes is increased more and more, the surface pressure in the vicinity of the bolt hole is high due to the tightening of the bolts, and in contrast, the surface pressure at the portion between the bolt holes, in particular, at the portion adjacent to the cylinder bore becomes low. As a result, the cylinder inner tube surface is pushed inwardly by the portion having the strong surface pressure, that is, the portion in the vicinity of the hole hole, and when the bolt hole is formed at each of four corners around the cylinder bore hole, the cross-section of the cylinder inner tube is deformed in a clover shape and the roundness is lost. When the engine is operated in this state, an increase in oil consumption, loss of power, exhaust gas contamination, and the like will be caused.

SUMMARY OF THE INVENTION

The present invention solves the problems mentioned above, and it is an object to provide a metallic gasket which is manufactured at a lower cost while ensuring a sufficient function corresponding to a high performance of an internal combustion engine, and at the same time, which has a small metallic contact seal area to reduce the absolute load, and which enables to reduce the rigidity of the engine and to ensure the roundness of the combustion chamber hole.

It is another object of the present invention to provide a metallic gasket which suppresses the deflection of the portion between the bolt holes of the cylinder head due to tightening of the bolts while ensuring high sealing, and which reduces a surface pressure difference between the portion near the bolt hole and the portion around the combustion chamber (cylinder bore) hole due to the tightening of the bolts thereby to make uniform the surface pressure around the combustion chamber hole, and which enables to ensure the roundness of the combustion chamber hole.

In a first aspect of the present invention, a metallic gasket interposed between joining surfaces of a cylinder block and a cylinder head for sealing between these joining surfaces, comprises a single base plate made of metal having at least a combustion chamber hole formed therein, a folded portion of the base plate formed by folding an edge of the combustion chamber hole back onto the base plate, a soft member held inside the folded portion of the base plate, a bead made of a rubber family material formed on at least one joining surface of the base plate so that a height of the bead is higher than that of the folded portion, a further folded portion formed at a position within a joining area of the base plate, the further folded portion being different from the folded portion of the combustion chamber hole, and a shim plate held in the further folded portion. In this respect, the position at which the bead is formed includes a position at which the surface pressure is required to be stabilized when the metallic gasket is interposed, for example, around the combustion chamber hole, around the bolt hole, and the like, or a position at which a boundary is to be formed between areas in the joining surface, for example, a seal position to form a boundary between an oil hole and a water hole. Furthermore, as the soft member, for example, an expansible graphite sheet, an ethylene 4-fluoride sheet of polyimide or the like, mica, or a metallic plate of lead, zinc, copper, or soft iron. The position at which the shim plate is held is not particularly limited so long as the position enables to prevent a deformation of the joining surfaces of the cylinder block and cylinder head in the whole joining area of the base plate with the cylinder block and cylinder head.

In the metallic gasket of the present invention, when the metallic gasket is assembled by interposing it between the cylinder block and the cylinder head, with respect to the deviation of tightening force caused depending on a difference in distance from a tightening member such as a bolt, the folded portion and the soft member inside the folded portion are deformed suitably to follow the deviation so that the surface pressure due to the tightening force is made uniform by this deformation. Furthermore, the bead made of a rubber family material is elastically deformed to promote the uniforming of the surface pressure, and a sufficient sealing effect is ensured and achieved. Moreover, it results in that only the portion around the combustion chamber hole is directly applied with the surface pressure at the time of assembling, and thus, the overall tightening force can be reduced. Furthermore, since the metallic gasket includes the single base plate, and the edge of the combustion chamber hole of the base plate is folded, the number of metal molds to be manufactured can be reduced, and the manufacturing cost including a material cost can be reduced to a great extent. In addition, since the bead can be formed easily by a dispenser method of one stroke, or by a metal mold, a very inexpensive metallic gasket can be manufactured.

In the above-mentioned first aspect of the present invention, with respect to the deviation in the tightening force of the tightening member, since the further folded portion promotes the uniformity of the surface pressure due to the tightening force, the deformation of the cylinder block and cylinder head is suppressed. Moreover, since the shim plate is held in the inside of the further folded portion, it is prevented that the metallic gasket is in contact with the cylinder block and cylinder head only at a position around the combustion chamber hole, and by virtue of this, the surface pressure is not concentrated to only the position around the combustion chamber hole, and the deformation of the cylinder block and cylinder head can be prevented.

When the folded portion is formed, in some cases, the end portion of the folded portion is not completely flattened. If the metallic gasket is interposed between the cylinder block and cylinder head with the end portion of the folded portion is not flattened, as will be easily presumed, the sealing property will be reduced at this end portion. On the other hand, in order to collapse the end portion and to flatten, an excessively large load is needed, and at the same time, there is a possibility of causing a spring back by collapsing by applying the large load. In this respect, it is very difficult to flatten by collapsing the end portion when the plate thickness is equal to 0.3 mm or larger. Accordingly, in a preferred embodiment, the end portion of the folded portion is positioned outside the joining surface of at least one of the cylinder block and cylinder head. By virtue of this, the sealing property is not degraded, and there is no need to apply the large load to flatten the end portion. Thus, it becomes possible to accurately calculate a gasket load at the time of mounting.

As will be apparent from the foregoing description, the metallic gasket of the present invention provides the following advantage. The metallic gasket can be manufactured very inexpensively, and the surface pressure between joining surfaces of the cylinder block and cylinder head due to the tightening member such as a bolt can be made more uniform, sufficient sealing property is ensured, and the roundness of the combustion chamber hole can be ensured. Thus, the fuel consumption of the engine is improved, the power loss is reduced, and the longer life can be achieved. Furthermore, by the folded portion, the tightening force due to the tightening member is dispersed to become uniform, and the sufficient sealing property is ensured by the folded portion and the soft member held inside, and the roundness of the combustion chamber hole is ensured. Furthermore, since the metallic gasket includes the single base plate and an edge of the combustion chamber hole or the like is folded, the number of metal molds to be manufactured can be reduced, and the manufacturing cost including the material cost can be reduced. Furthermore, the surface pressure between the joining surfaces of the cylinder block and cylinder head is made more uniform, and sufficient sealing property can be ensured.

Furthermore, the surface pressure is not concentrated to only the position around the combustion chamber hole, and the deformation of the joining surfaces of the cylinder block and cylinder head can be prevented.

In a preferred embodiment of the invention, when the further folded portion is formed within the joining area of the base plate in addition to the folded portion of the combustion chamber hole, the end portion of the further folded portion is positioned at the outside of at least one of the joining surfaces of the cylinder block and cylinder head. By virtue of this, the sealing property is not degraded, and there is no need to apply a load to flatten the end portion, and an accurate gasket load at the time of interposing the gasket can be calculated.

In another embodiment of the invention, the further folded portion is formed at an outer peripheral edge of the base plate. By virtue of this, the surface pressure at the joining surfaces of the cylinder block and cylinder head is made uniform and the deformation of the cylinder block and cylinder head can be prevented.

In still another embodiment of the invention, a bolt hole is formed in the base plate, and the further folded portion is formed at an edge of the bolt hole. By virtue of this, an axial force of the joining member such as the bolt is dispersed by the further folded portion, and the surface pressure due to the tightening force in the vicinity of the tightening member such as the bolt is made more uniform, and the deformation of the cylinder block and cylinder head can be suppressed.

In still another embodiment of the invention, the base plate is formed with a step portion so that a height of one joining surface of the folded portion from one joining surface of the base plate is substantially equal to a height of the other joining surface of the folded portion from the other joining surface of the base plate. By virtue of this, when the metallic gasket is interposed between the cylinder block and cylinder head, the joining surfaces of the folded portion respectively protrude to the same extent towards the joining surface side of the cylinder block and towards the joining surface side of the cylinder head from the base plate. As a result, the folded portion contacts with both the cylinder block and cylinder head uniformly, and since the folded portion has its own spring property due to the step portion, the folded portion is suitably deformed following to the deformation of the cylinder block and cylinder head caused by the tightening force or by the thermal effect during operation of the engine, so that the surface pressure is made more uniform.

In still another embodiment of the invention, a width of the soft member held inside the folded portion is changed partially along a circumferential direction of the combustion chamber hole. By virtue of this, with respect to the tightening force of the tightening member such as the bolt, a repulsive force of the folded portion is increased as the width of the soft member is increased, and the repulsive force is decreased as the width of the soft member is decreased. Accordingly, the surface pressure around the combustion chamber hole generated to the cylinder block and cylinder head can be made more uniform by increasing the width of the soft member at a position remote from the tightening member and at which position, the tightening force is small, and by decreasing the width of the soft member at a position near the tightening member and at which position the tightening force is large.

In still another embodiment of the invention, a thickness of the soft member held inside the folded portion is changed partially along a circumferential direction of the combustion chamber hole. When, for example, a distance between bolt holes formed in the base plate is large, or when the number of water holes is large, the nonuniformity of the surface pressure is increased. Thus, by increasing the thickness of the soft member at such a position, the surface pressure around the combustion chamber hole generated in the cylinder block and cylinder head is made uniform.

In still another embodiment of the invention, a surface treatment material is applied on at least one of the joining surfaces of the base plate. As the surface treatment material, for example, fluorine rubber, nitrile rubber (NBR), an expansible graphite sheet, or the like may be used. Thus, the surface of the metallic gasket is smooth by the surface treatment material, and the surface treatment material compensates for the roughness of the joining surfaces of the cylinder block and cylinder head, and the leakage of the pressure is prevented during operation of the internal combustion engine.

In still another embodiment of the invention, a lubricant is applied on the joining surfaces of the folded portion. As the lubricant, molybdenum disulphide, graphite, or the like may be used. Thus, the joining surfaces of the folded portion are smooth by the lubricant, and the metals of the joining surfaces of the cylinder block and cylinder head are not in direct contact with the metal of the base plate. As a result, the occurrence of flaws on the joining surfaces of the folded portion is prevented. Furthermore, it is possible to prevent rubbing due to a difference in thermal expansion during operation of the internal combustion engine when the cylinder block and cylinder head are made of different kinds of metals, to prevent scratching due to fretting caused by the rubbing, and to prevent leakage of pressure by virtue of the microsealing effect.

In still another embodiment of the invention, at least one kind of plating is applied on at least inner surface of the combustion chamber hole of the base plate. As the plating, metal plating, resin plating, mixed plating of metal and resin, or the like may be used. By virtue of this, even when the internal combustion engine to which the metal gasket is interposed, for example, is an outboard motor which is cooled by sea water, a general purpose engine for both sea water and fresh water, or the like, it is possible to ensure corrosion resistance, and chemical resistance, and to compensate for stable sealing property for a long period. Such plating is pretreated after formation of the hole, and before applying the surface treatment material and the lubricant.

In still another embodiment of the invention, a wire-shaped soft member is held inside the end portion of the folded portion of the combustion chamber hole of the base plate along the whole circumference of the combustion chamber hole. By virtue of this, the wire-shaped soft member is collapsed between the cylinder block and cylinder head due to the tightening force by the tightening member such as a bolt, and a gap between joining surfaces of the metal gasket and the cylinder block and a gap between joining surfaces of the metal gasket and the cylinder head are blocked by the amount of collapse of the soft member. Thus, more satisfactory sealing can be ensured.

In still another embodiment of the invention, at least two wire-shaped soft members of different diameters are held inside the folded portion of the combustion chamber hole of the base plate along the whole cicumference of the combustion chamber hole. When a high surface pressure is needed at the end portion of the folded portion of the combustion chamber hole, a soft member having a large diameter is held at an inner side of the inside of the folded portion, and a soft member having a small diameter is held at an outer side of the inside of the folded portion. By virtue of this, with respect to the tightening force by the tightening member such as a bolt, the amount of collapse of the soft member is larger at the side near the combustion chamber than that at the remote side, and the deformation of the soft member is suitably proportional to the surface pressure so that a high surface pressure can be ensured at the end portion of the folded portion of the combustion chamber hole. In the other case, for example, where an engine is formed by press fitting a cast iron sleeve into a cylinder block made of aluminum, there is a possibility that the inner peripheral edge of the cast iron sleeve is deformed and rounded, and the roundness of the combustion chamber hole is degraded when a large load is applied to the end portion of the folded portion of the combustion chamber hole. Accordingly, in such a case, a soft member of a small diameter is held at the inner side of the inside of the folded portion, and a soft member of a large diameter is held at the outer side of the folded portion. By this arrangement, the amount of collapse of the soft member remote from the combustion chamber is larger than that at the near side of the combustion chamber so that the deformation of the soft wire is suitably proportional to the surface pressure, and tightening surface pressure around the combustion chamber hole is averaged. As a result, it is possible to prevent that the inner peripheral edge of the cast iron sleeve is deformed and rounded, and the roundness of the combustion chamber hole is degraded.

In still another embodiment of the invention, a shim plate is held in the folded portions at a position between adjacent combustion chamber holes. By virtue of this, in particular, when the rigidity of the cylinder block and cylinder head is small, since the shim plate is held between adjacent combustion chamber holes at which the surface pressure is low, the surface pressure is made uniform by the shim plate.

In still another embodiment of the invention, at least one metallic bead surrounding the combustion chamber hole is formed on at least one joining surface of the folded portion of the base plate for the combustion chamber hole within a width of the folded portion. By the formation of the metallic bead, the contact of the metallic gasket with the cylinder block or the cylinder head is changed from surface contact to line contact so that the deformation of the soft member held in the inside of the folded portion becomes easy. As a result, for example, a difference in surface pressure between a high pressure portion near the tightening position by a bolt or the like and a low pressure portion at an intermediate position between adjacent bolts can be made significant. In particular, when at least two metallic beads are formed spaced from each other in a radial direction of the combustion chamber hole so that a cross section has a wave shape, the number of line contacts is increased and a seal surface becomes high pressure to promote the laby rinth effect. Thus, even if the leakage is caused by one metallic bead, the sealing property can be ensured by the other metallic bead.

In still another embodiment of the invention, a height of the metallic bead is partially changed along a circumferential direction of the combustion chamber hole. By virtue of this, with respect to the tightening force by a tightening member such as a bolt, the higher the metallic bead, the larger becomes a repulsive force, and conversely, when the height is lower, the repulsive force is reduced. However, by forming the metallic bead with large height at a position of small tightening force, and by forming the metallic bead with small height at a position of large tightening force, the surface pressure around the combustion chamber hole generated in the cylinder block and cylinder head can be made uniform.

In still another embodiment of the invention, foam rubber is coated on both joining surfaces of the base plate except for the folded portion so that a height of the foam rubber is higher than that of the folded portion.

In the metallic gasket having the folded portion of the combustion chamber hole and another folded portion formed, for example, for an outer peripheral edge of the base plate, or a bolt hole, when it is interposed between the cylinder block and cylinder head, gaps are caused between a part of the base plate having no folded portions and the cylinder block and cylinder head. In particular, in the case of a water-cooled engine, cooling water is circulated by a pump, and a water pressure is apt to be high near the pump, and conversely, the water pressure is apt to be low remote from the pump. For this reason, in a metallic gasket having water holes corresponding to a water jacket of the water-cooled engine, the regulation of the water pressure is effected by changing the size of the water holes. However, when the base plate-has a large thickness, there is a possibility that the gaps become large and a short circuit is caused. For this reason, in the above-mentioned embodiment, the foam rubber which requires small surface pressure is coated on both the joining surfaces of the base plate except for the folded portions thereby to prevent the short circuit between the water holes without requiring a large surface pressure.

In still another embodiment of the invention, a bead made of a rubber family material is formed on at least one joining surface of the base plate so that a height of the bead is higher than that of the folded portion of the combustion chamber hole, and an edge of the base plate which has been folded back is further bent towards the base plate side. By virtue of this, the soft member held in the inside of the folded portion is prevented from extruding from the inside of the folded portion.

In still another embodiment of the invention, inner surfaces of the folded portion are made to be high frictional resistance surfaces having a high frictional resistance. In order to form these high frictional resistance surfaces, the base plate may retain a state in which no finishing work is performed, or irregularities or flaws may be formed on the base plate. Since the inner surfaces of the folded portion have the high frictional resistance surfaces, the soft member held by the folded portion is difficult to move, and the soft member is difficult to be displaced in the inside of the folded portion, or to protrude from the inside.

In still another embodiment of the invention, at least a portion of the base plate at which the bead of a rubber family material is to be formed is made a high frictional resistance surface having a high frictional resistance. In order to form these high frictional resistance surfaces, the base plate may retain a state in which no finishing work is performed, or irregularities or flaws may be formed on the base plate. By virtue of this, when the bead is formed on the base plate by a dispenser method of one stroke, or by using a metallic mold, the bead is more securely fixed to the base plate.

In a second aspect of the present invention, a metallic gasket interposed between joining surfaces of a cylinder block and a cylinder head for sealing between these joining surfaces, comprises a base plate made of metal having at least a combustion chamber hole formed therein, a folded portion of the base plate formed by folding an edge of the combustion chamber hole back onto the base plate, a soft member held inside the folded portion of the base plate, and a bead made of a rubber family material formed on at least one joining surface of the base plate so that a height of the bead is higher than that of the folded portion, wherein when a straight line passing through center points of adjacent combustion chamber holes is expressed as a reference line, a straight line passing through center points of two bolt holes opposing each other at both sides of the reference line is expressed as a first bolt line, and a straight line passing through center points of a plurality of bolt holes located at each side of the reference line is expressed as a second bolt line, a large thickness portion having a thickness larger than that of the base plate and smaller than that of the folded portion is formed at least at a position within a joining area of the base plate located at a base plate edge side from each of the bolt holes on the first bolt line, and a position within the joining area of the base plate located at a base plate edge side from each of bolt holes at opposite ends on the second bolt line.

The large thickness portion may be formed by folding back an edge of the base plate, or by attaching a shim plate which is a separate member from the base plate at a corresponding position. However, when it is formed by attaching the separate member from the base plate, it is not preferable that a member used is of a material having a low rigidity as a rubber material but a metal having a rigidity comparable to that of the base plate is preferable.

The positions at which the bead is formed include a position at which the surface pressure is required to be stabilized at the time of mounting the metallic gasket, for example, a position around the combustion chamber hole, a position around a bolt hole, and the like, and a position between spaces to be bounded between the joining surfaces, for example, a sealing position to bound between an oil hole and a water hole.

In the metallic gasket of the present invention, when the metallic gasket is assembled by interposing it between the cylinder block and cylinder head, the folded portion of the combustion chamber hole and the soft member inside the folded portion are suitably deformed to follow a deviation in the tightening force which is dependent on a distance from a tightening member such as a bolt, and at the same time, the bead made of a rubber family material is elastically deformed so that a sufficient sealing effect can be ensured.

In this regard, the deformation of the cylinder head with respect to the tightening of the bolt at a cross section along the first and second bolt lines at which the large thickness portions are formed is presumed as follows. That is, since the folded portion of the combustion chamber hole is thicker than the large thickness portion at least by a thickness of the soft member, the cylinder head is pushed against the folded portion of the combustion chamber hole, and a portion between bolt holes of the cylinder head is first deformed with an upper side curved in a convex shape. Following this, the edge portion of the base plate is brought into contact with the large thickness portion. However, since the large thickness portion, for example, is formed of metal having a rigidity comparable to that of the base plate and does not have a soft member held therein, the large thickness portion is hardly deformed and supports the deformation of the cylinder head. Furthermore, when the tightening force is increased, the large thickness portion serves as a counter, and generates a force to deform the portion between the bolt holes of the cylinder head with a lower side curved in a convex shape. Since this force is generated in a direction to cancel the deformation of the cylinder head caused by the contact of the folded portion of the combustion chamber hole with the cylinder head, the deformation of the cylinder head is suppressed.

As a result, at a portion on the first or second bolt hole line having the large thickness portion formed at the above-mentioned position, a difference between the surface pressures at a position near the bolt hole and a position adjacent to the combustion chamber hole between the bolt holes becomes small.

The metallic gasket of the present invention provides an advantage that the seal effect can be ensured by the folded portion of the combustion chamber hole, the soft member held inside the folded portion, and the bead formed of a rubber family material.

Furthermore, by virtue of the large thickness portion formed at the base plate edge side on each of the lines indicating the disposition of the bolt holes, the deformation of the cylinder head at the time of tightening the bolt is suppressed, and the difference between the surface pressures at a position near the bolt hole and a position adjacent to the combustion chamber hole.

In a preferred embodiment, in the metallic gasket of the present invention, the first bolt hole line is a straight line which passes through center points of two bolt holes located line symmetrically at opposite sides of the reference line.

In a still another embodiment, the first and second bolt hole lines are assumed for all the bolt holes, and the large thickness portions are formed at all of the positions within a joining area of the base plate located at a base plate edge side from each of the bolt holes on the first bolt line, and the positions within the joining area of the base plate located at a base plate edge side from each of bolt holes at opposite ends on the second bolt line. Since the large thickness portions are formed at all of the above-mentioned positions on the first and second bolt hole lines, the surface pressures at the whole circumferene of the combustion chamber hole are averaged, and the roundness of the combustion chamber hole can be ensured. As a result, in the engine using the above-mentioned metallic gasket, the oil consumption is reduced, the fuel consumption is improved, the power loss is reduced, and the exhaust gas contamination is reduced.

In a still another embodiment, a part or all of the plurality of large thickness portions are formed by folding back an edge of the base plate. By forming the large thickness portion by the folded portion, the surface pressures around the cylinder bore is easily averaged, and thus, the manufacturing cost is suppressed low.

In order to form the folded portion by folding the edge of the base plate, at the time of forming the base plate, that is, at the time of cutting an outer peripheral portion of a metallic plate in a predetermined shape, and forming various holes at predetermined positions of the metallic plate, the metallic plate is formed so that the edge portion intended to be folded back protrudes outwardly integral with the main part of the metallic plate, and then the protruded edge portion is folded back on the base plate. The folded portion means a two layer portion at which the protruded edge portion is folded back on the base plate.

Accordingly, when a part or all of the plurality of large thickness portions formed on the base plate are formed by folding the edge of the base plate, the large thickness portions are easily formed by folding back the protruded edge portion. However, if it is difficult to form such folded portions in view of the design of the base plate, the large thickness portions may be formed by attaching shim plates at the corresponding positions. Similar effects will be achieved.

In the case of forming the folded portion, there will be a case in which an end of the folded portion is not completely flattened. When the metallic gasket is interposed between the cylinder block and cylinder head while the end of the folded portion is not flattened, that is, the end is formed in a round shape extruding slightly to upper and lower sides of the folded portion, as will be easily presumed, the shape of the round portion at the end of the folded portion is gradually changed by repetition of cold and hot cycles of operation and stopping, and the sealing property will be deteriorated at this end portion of the folded portion. Furthermore, in order to collapse and flatten the round end portion, an excessively large load will be needed, and spring back or crack will be caused in collapsing and flattening by applying the load. In this respect, it is very difficult to collapse and flatten the end portion when a plate thickness is 0.3 mm or larger.

In a still another embodiment, the end portion of the folded portion which is formed as the large thickness portion is positioned outside of at least one of the joining surfaces of the cylinder block and cylinder head. By virtue of this, the sealing property is not lost, and also there is no need to apply the load to flatten the end portion. Furthermore, it becomes possible to accurately measure a gasket load at the time of interposing the gasket.

In a still another embodiment, a step portion is formed between the folded portion (large thickness portion) and the base plate so that the height of an upper joining surface of the folded portion of the combustion chamber hole (large thickness portion) from an upper joining surface of the base plate is made equal to the height of a lower joining surface of the folded portion (large thickness portion) from a lower joining surface of the base plate. By virtue of this, when the metallic gasket is interposed, the joining surfaces of the folded portion of the combustion chamber hole and the joining surfaces of the large thickness portion respectively protrude to the same degree towards the joining surface of the cylinder block and towards the joining surface of the cylinder head. As a result, the joining surfaces of the cylinder block and the joining surfaces of the cylinder head are uniformly in contact with both the cylinder block and the cylinder head, and since the folded portion has its own spring property by the step portion, the folded portion and the large thickness portion are suitably deformed to follow the deformation of the cylinder block and the cylinder head due to the influence of the tightening force or the heat generated during operation. Thus, the uniformity of the surface pressures can be promoted.

DESCRIPTION OF THE PREFERRED EMBODIMENTS

FIGS. 1 to 4 show one embodiment of the present invention.

Figure 4:
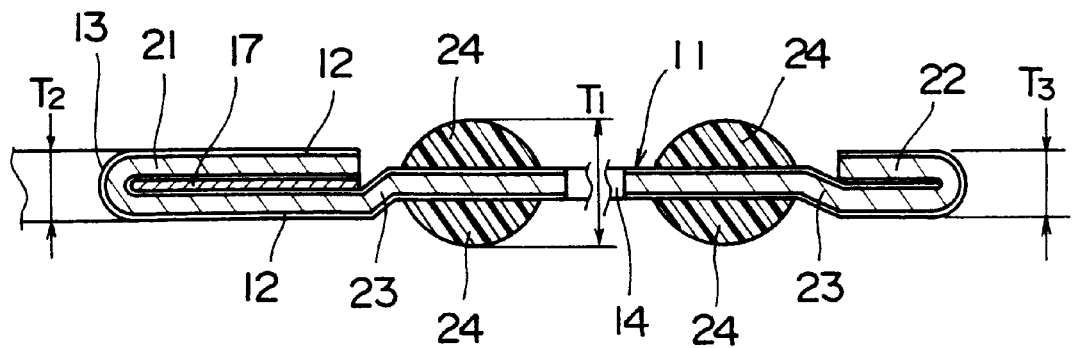
FIG. 4 is a sectional view taken along the line C—C in FIG. 1.

Referring to these figures, a metallic gasket 10 includes a base plate 11 made of metal such as stainless steel, and a plurality of holes are formed in the base plate 11. The base plate 11 has inner surface of each hole and both joining surfaces around each hole applied with plating such as metal plating, resin plating, or mixed plating of metal and resin, and furthermore, a surface treatment material 12 such as fluorine rubber, nitrile rubber (NBR), molybdenum disulfide, or the like is baked on the surfaces of the base plate 11 depending on finishing roughness of the joining surfaces of a cylinder block and a cylinder head which constitute an engine. In FIG. 4, the surface treatment material 12 is shown somewhat exaggerated, but the other figures do not show.

The plurality of holes include a plurality of cylinder bore holes 13 corresponding to cylinder bores (combustion chambers) of the cylinder block, bolt holes 14 corresponding to positions of tightening bolts for connecting the cylinder block and the cylinder head, oil holes 15 corresponding to oil galleries for supplying lubricating oil to each slidably moving part such as a piston (not shown) or the like, and water holes 16 positioned at an inside portion of a water jacket for supplying cooling water to the cylinder block and the cylinder head whose temperature rises due to combustion of fuel and the sliding motion of the piston. These holes 13 to 16 are in communication with respective parts of the engine when the metallic gasket 10 is interposed between the cylinder block and cylinder head to construct the engine.

Figure 2:
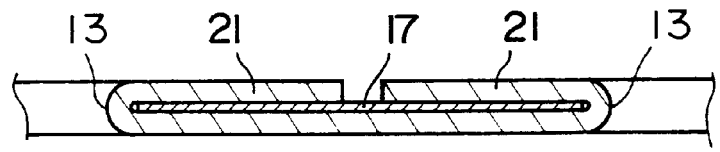
FIG. 2 is a sectional view taken along the line A—A in FIG. 1.
Figure 3:
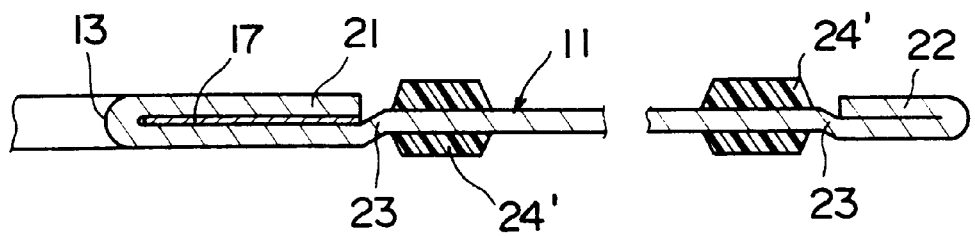
FIG. 3 is a sectional view taken along the line B—B in FIG. 1.

Among the holes 13 to 16, for the cylinder bore holes 13, an edge of the hole 13 of the base plate 11 is folded back to form a folded portion 21 as shown in FIGS. 2 to 4, and a soft member 17 made from, for example, an expansible graphite sheet is held inside of the folded portion 21. The plate thickness of the soft member 17 is varied depending on the structure of the engine, however, about 0.3 mm is a standard thickness, and in this example, a soft member having a density of 1.0 is held inside and compressed by a pressure of 600 kg/cm² to compress and deform by about 30 to 40%. On the other hand, folded portions 22 folded to the same joining surface side as the folded portions 21 of the cylinder bore holes 13 are formed at predetermined positions on an outer peripheral edge of the base plate 11. Specifically, the size of the folded portions 22 is changed depending on the position at which each of the folded portion 22 is formed. The folded portion 22 formed at one side of the outer peripheral edge of the base plate 11 extends in the whole width direction, and some of the folded portions 22 are formed on a long side of the outer peripheral edge of the base plate 11 at positions corresponding to positions between bolt holes 14 and positions near the bolt holes 14. The folded portions 22 are simply folded back and no member is held inside of the folded portions.

Although not shown in the figures, both joining surfaces of the folded portions 21 and 22 are coated with a lubricant such as molybdenum disulfide, graphite, or the like, and on the other hand, inner surfaces of the folded portions 21 and 22 are formed with irregularities or flaws.

Here, as to the soft member 17, although different depending on the rigidity of the engine, the larger the rigidity, the more thickness can be reduced. That is, a thinner soft member 17 can be used. Furthermore, the soft member 17 is not limited to the expansible graphite sheet, but, for example, a soft metallic plate such as a lead plate, a zinc plate, a copper plate, a soft steel plate, or the like, or an ethylene 4-fluorine sheet (e.g. polyimide sheet), or mica may be used.

Since the folded portions 21 and 22 are formed at the edge of the cylinder bore holes 13 and at the positions corresponding to the bolt holes 14 on the outer peripheral edge of the base plate 11, the folded portions 21 and 22 protrude to one side of the joining surfaces of the base plate 11. However, as shown in FIGS. 3 and 4, a step portion 23 is formed in the base plate 11 at a connecting portion between the folded portion 21 and the other part of the base plate 11, and also, another step portion 23 is formed in the base plate 11 at a connecting portion between the folded portion 22 and the other part of the base plate 11. The step portion 23 is formed, in FIGS. 3 and 4, such that the upper and lower joining surfaces of the folded portions 21 and 22 are stepped downwardly. As a result, the height of the upper joining surface of the folded portions 21 and 22 from the upper joining surface of the base plate 11 is made equal to the height of the lower joining surface of the folded portions 21 and 22 from the lower joining surface of the base plate 11. However, as shown in FIG. 2, the step portion 23 is not formed at a position at which the distance between adjacent cylinder bores 13 is narrow.

Figure 1:
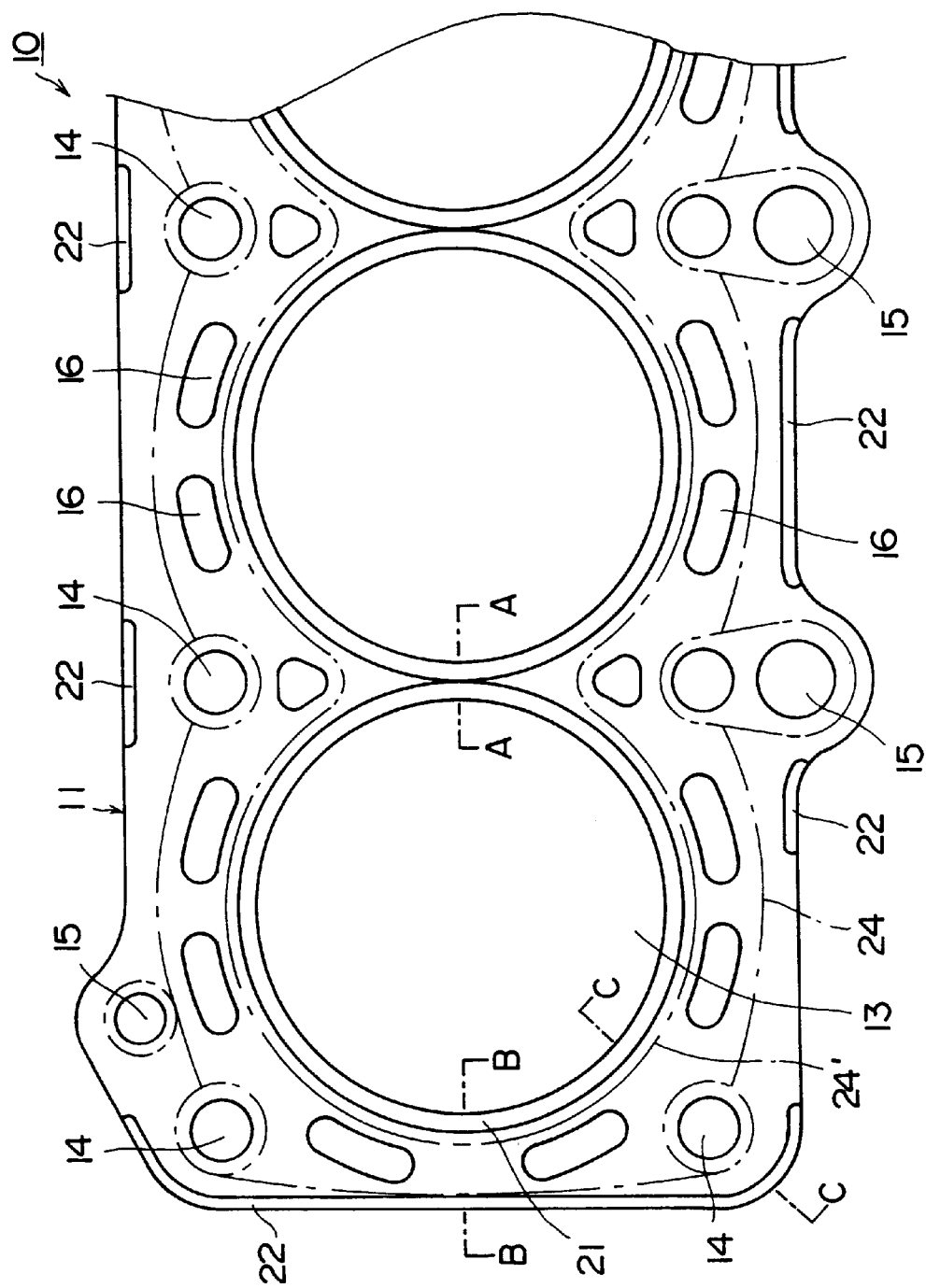
FIG. 1 is a plan view showing a structure of one example of a metallic gasket of the present invention.

On the other hand, a rubber beads 24, 24' made of, for example, silicon rubber is formed on each of both joining surfaces of the base plate 11. The rubber bead 24' is formed around the cylinder bore hole 13, and rubber bead 24 is formed around each bolt hole 14, and beads 24, 24' are also formed to bound each of the cylinder bore holes 13, bolt holes 14, oil holes 15 and water holes 16. In FIG. 1, the locus of the rubber bead 24, 24' is represented by a long and short dash line. Further, as shown in FIGS. 3 to 4, the rubber bead 24 formed, in particular, around the bolt hole 14 has a cross section perpendicular to the joining surfaces in a semicircular shape, and at the same time, the rubber beads 24 on both joining surfaces are symmetrical. The rubber beads 24' formed at the other positions have a cross section perpendicular to the joining surfaces in a trapezoidal shape, and the rubber beads 24 on both joining surfaces are symmetrical. In this example, although the shapes of the cross section of the rubber beads 24, 24' are the semicircular shape and the trapezoidal shape, all of the rubber beads 24, 24' may be formed in the semicircular shape or the trapezoidal shape or in the other shape. Furthermore, some irregularities or flaws may be formed beforehand on the base plate 11 at positions at which the rubber beads 24, 24' are to be formed so that the rubber beads 24, 24' can be formed in a good state.

These rubber beads 24, 24' are formed on both the joining surfaces of the base plate 11 so that the height of an upper peak of the rubber beads 24, 24' from the upper joining surface of the folded portion 21 and 22 is equal to the height of a lower peak of the rubber beads 24, 24' from the lower joining surface of the folded portion 21 and 22, and in addition, a distance between the upper peak and the lower peak of the opposing rubber beads 24, 24' is 1.5 times as large as the thickness of the folded portions 21 and 22. In this case, as regards the thickness of the metallic gasket 10, supposing that the height of the opposing rubber beads 24, 24' measured between the upper and lower peaks is represented by T1, the thickness of the folded portion 21 of the cylinder bore hole 13 is represented by T2, and the thickness of the folded portion 22 at the outer peripheral edge near the bolt hole 14 is represented by T3, it is necessary that the relation among these thicknesses T1, T2, and T3 satisfy that the magnitude is larger in this order of T1, T2, and T3. The rubber bead 24, 24' may be formed, for example, by a dispenser method of one stroke, screen printing, mold type using a metal mold, or the like, and in particular, when the screen printing is used, a stitch pattern can be easily obtained.

In this case, it is possible to form the rubber bead 24, 24' on only one of the joining surfaces, and a metallic bead is formed on the other joining surface so that the metallic bead protrudes to this joining surface side. However, a metallic mold is necessary to form the metallic bead.

The metallic gasket 10 formed in this manner is designed, when it is interposed between the joining surfaces of the cylinder head and cylinder block, so that an area of a metallic surface (in practice, the surface treating material 12 is coated) which contacts the joining surface of the cylinder head or cylinder block is about 25% of the whole area of the metallic gasket 10. Such a design is intended to reduce as far as possible the absolute load which is applied when the metallic gasket 10 is interposed between the cylinder block and cylinder head, and tightened by tightening members such as bolts.

Next, the function of the metallic gasket 10 will be explained. When the metallic gasket 10 is interposed between the cylinder block and cylinder head constituting the engine, and tightened by tightening members such as bolts, the metallic gasket 10 is deformed in a collapsing direction due to surface pressure of the cylinder block and cylinder head caused by the tightening force. More specifically, the rubber bead 24 which is the highest is elastically deformed in the collapsing direction, and next, the folded portions 21 and 22 are deformed in the collapsing direction, and the soft member 17 is deformed by the deformation of the folded portion 21. At this time, in the folded portion 21, supposing that the plate thickness of the soft member 17 is 0.3 mm, at a part of the soft member 17 near the bolt and having a high surface pressure, the soft member 17 is deformed by about 50% to have a thickness of about 0.15 mm, and at a part of the soft member 17 remote from the bolt and having a low surface pressure, for example, a position between adjacent cylinder bore holes 13, or a position between bolt holes 14, the thickness is reduced to about 0.18 to 0.20 mm. Thus, since the the soft member 17 is deformed to have a thinner thickness at a part having a high surface pressure, and conversely, the soft member 17 is deformed to have a thicker thickness at a part having a low surface pressure as compared with the part having the high surface pressure, a substantially uniform surface pressure is applied to the metallic gasket 10.

With respect to the deformation of the cylinder block and cylinder head due to the tightening force, the folded portions 21 and 22 and the soft member 17 are deformed by a repulsive force to follow the deformation of the cylinder block and cylinder head. As a result, gaps between the joining surfaces of the cylinder block and cylinder head and the metallic gasket 10 are blocked. Furthermore, in the vicinity of the bolt hole 14, since the folded portion 22 is in direct contact with the joining surfaces of the cylinder block and cylinder head, an axial force is hardly reduced. Furthermore, since the folded portions 21 and 22 possess themselves a spring property due to the formation of the step portions 23, the folded portions 21 and 22 are suitably deformed and ensure the sealing property.

In the engine mounting the metallic gasket 10 as described above, the seal pressure is highest at a position around the cylinder bore hole 13 during operation. Supposing that the highest pressure of combustion gas during operation of the engine is 100 kg/cm$^2$, and supposing that a gasket coefficient is 6, the pressure applied to a position around the cylinder bore hole 13 is equal to "600 kg/cm$^2$× an area of the folded portion 21". Assuming that a diameter of the cylinder bore hole 13 is 80 mm, and a width of the folded portion 21 is 4.0 mm, and when the metallic gasket 10 is mounted on a four-cylinder engine, the area of the folded portion 21 is 43 cm$^2$, and thus, a pressure of 600× 43=25800 kg is applied.

Even when such a pressure is applied, the folded portion 21 and the soft member 17 held inside are deformed proportionately, and a satisfactory sealing property is maintained and ensured. Furthermore, the expansible graphite sheet as the soft member 17 has a good thermal conductivity, and its restoring force is not deteriorated even during heating period. In particular, in a compressed product having a high density, the deterioration of the restoring rate is very small, and the durability is ensured for a long time.

Figure 5A:
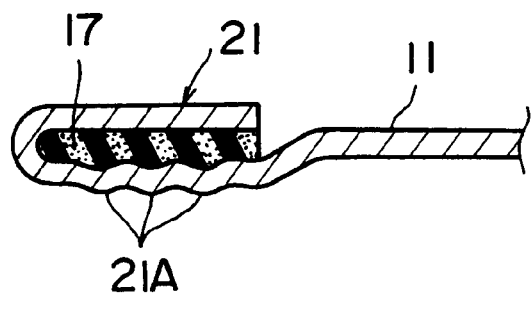
FIG. 5A is a sectional view showing metallic beads formed on one joining surface of the folded portion of the cylinder bore.
Figure 5B:
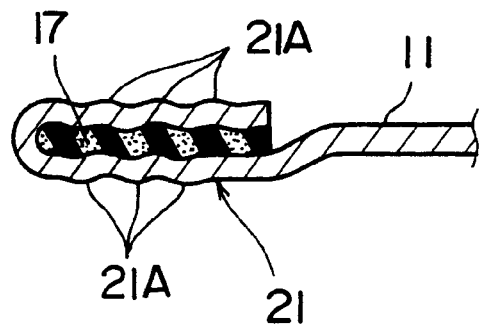
FIG. 5B is a sectional view showing metallic beads formed on both joining surfaces of the folded portion of the cylinder bore.

As shown in FIGS. 5A and 5B, when metallic beads 21A are formed around the cylinder bore hole 13 on one of the joining surfaces of the folded portion 21 within a width of the folded portion 21, or on both the joining surfaces of the folded portion 21, the following advantage is further obtained. That is, in the example shown in FIGS. 5A and 5B in which a plurality of metallic beads 21A are formed spaced from each other in a radial direction of the cylinder bore hole 13, and the cross section has a wave shape, the contact of the folded section 21 with the cylinder block or cylinder head is changed from surface contact to line contact due to the formation of these metallic beads 21A, and the deformation of the soft member 17 held inside of the folded section 21 becomes easy. Thus, there is an advantage that a difference between a high pressure portion near the bolt hole 14 and a low pressure portion between the bolt holes 14 can be made significant. In particular, by forming the metallic beads 21A plural in number, the number of line contact positions is increased and a high pressure is applied to a seal surface thereby to promote the labyrinth effect, and even when leakage occurs in one of the metallic beads 21A, the sealing property can be ensured by the other metallic beads 21A. However, even when a single metallic bead 21A is provided, the advantage of making the difference between the high pressure portion and the low pressure portion can be obtained.

Figure 6:
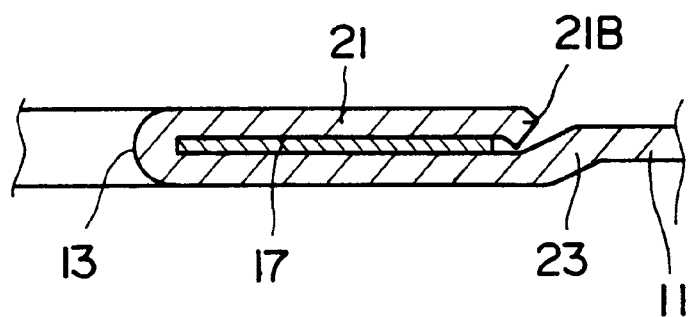
FIG. 6 is a sectional view showing an example in which an edge of an upper layer of the folded portion is further bent towards upper surface of the base plate.
Figure 7:
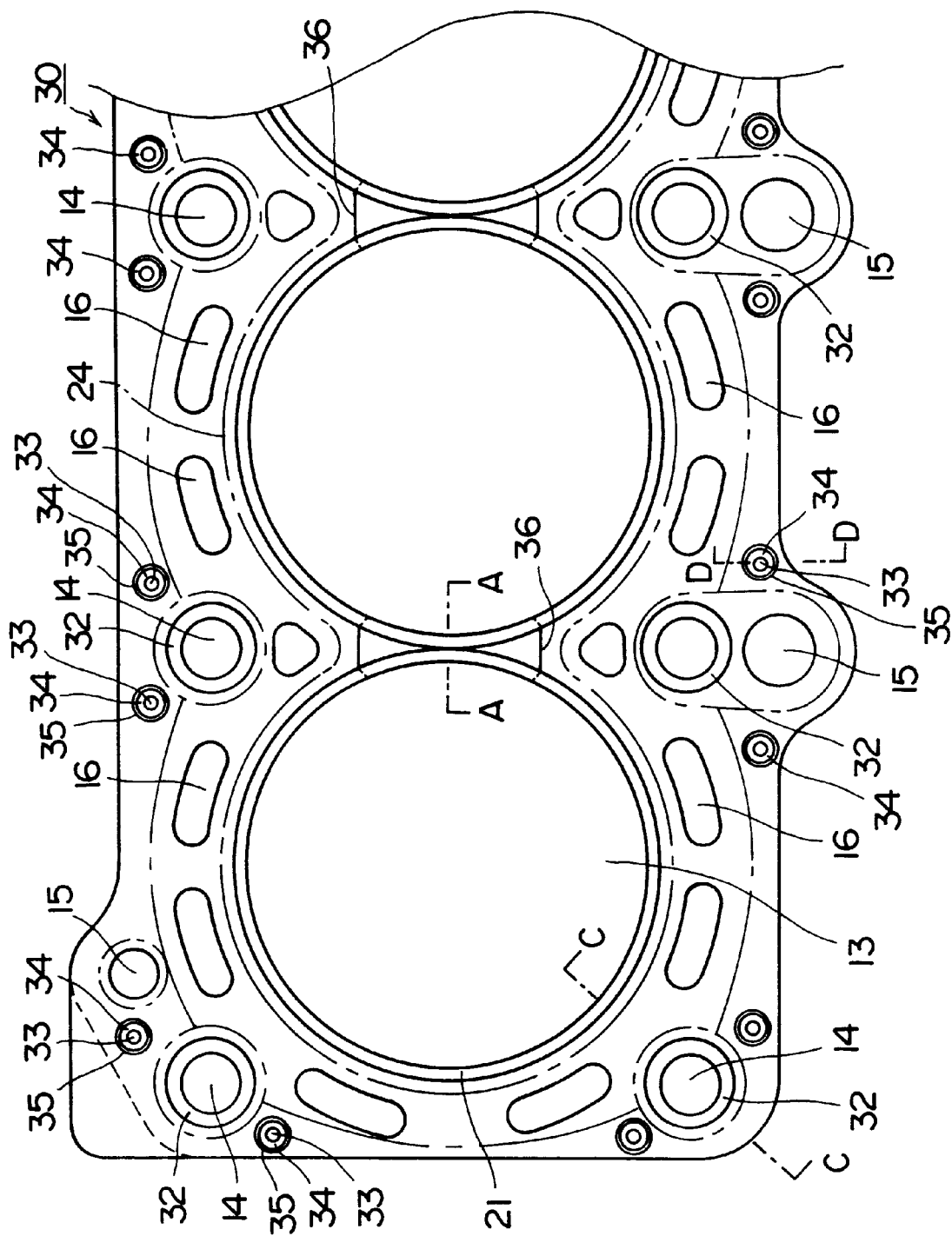
FIG. 7 is a plan view showing a structure of another example of a metallic gasket of the present invention.

As shown in FIG. 6, in the folded portion 21 of the cylinder bore hole 13 having the soft member 17 held inside, an edge 21B of the upper layer of the folded portion 21 may be further bent towards the upper surface of the base plate 11. By bending the edge 21B, the moving out of the soft member 17 from the inside of the folded portion 21 can be prevented.

FIGS. 7 to 10 show another metallic gasket 30 different from the metallic gasket 10. In this metallic gasket 30, a like part is designated by a like reference numeral as in the metallic gasket 10 so that the explanation is simplified.

Figure 8:
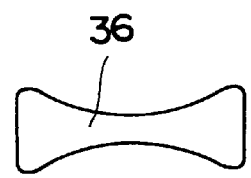
FIG. 8 is a plan view showing a shim plate used in an embodiment of the invention.
Figure 9:
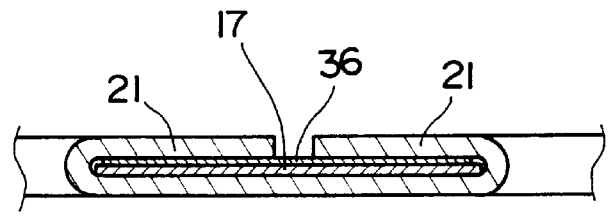
FIG. 9 is a sectional view taken along the line A—A in FIG. 7.
Figure 10:
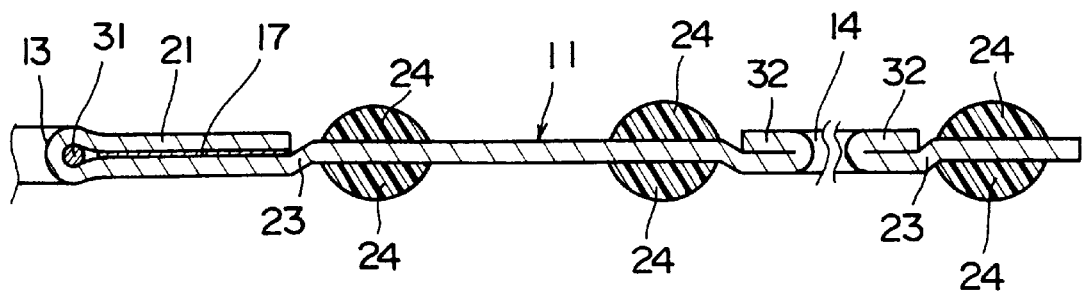
FIG. 10 is a sectional view taken along the line C—C in FIG. 7.
Figure 11:
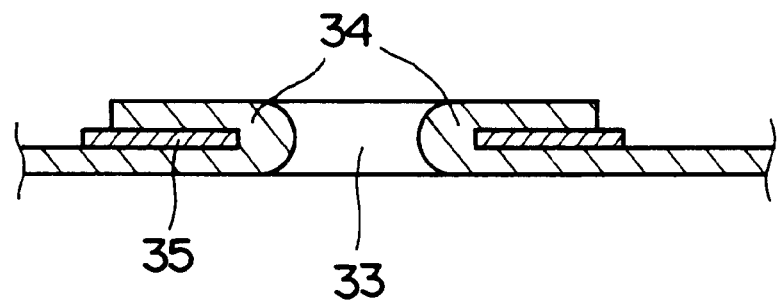
FIG. 11 is a sectional view taken along the line D—D in FIG. 7.

In the metallic gasket 30, a ring 31 made of a soft metallic material having a wire shape is held at an inner end of the inside of the folded portion 21 of, in particular, the cylinder bore hole 13 so that the ring 31 extends over the whole circumference of the cylinder bore hole 13. The metallic gasket 30 does not have the folded portion 22 which is formed in the metallic gasket 10 on the outer peripheral edge of the base plate 11 near the bolt hole 14, and instead, a folded portion 32 is formed by folding back an edge of the bolt hole 14. Furthermore, in the whole joining surface area of the base plate 11 with the cylinder block and cylinder head, a plurality of holes 33 are formed at positions at which the deformation of the joining surfaces of the cylinder block and cylinder head can be prevented, for example, at positions near the bolt hole 14 and between the outer peripheral edge of the base plate 11 and rubber beads 24, and then, an edge of each of the holes 33 is folded back to form a folded portion 34, and an annular-shaped shim plate 35 is held in the inside of the folded portion 34. Furthermore, at a position between adjacent cylinder bore holes 13, a piece of shim plate 36 made of a soft metallic material as shown in FIG. 8 is held in the inside of adjacent folded portions 21. Furthermore, in order to enable to easily identify whether or not the annular-shaped shim plate 35 is held in the inside of the folded portion 34, it is preferable that the shim plate 35 has a larger width than that of the folded portion 34.

The metallic gasket 30, in the case wherein the cylinder block and cylinder head are made of a material having a small rigidity such as an aluminum alloy or the like, can be expected to achieve further uniform surface pressure and to ensure sealing property by using together the soft member 17 such as an expansible graphite sheet or the like. That is, when the metallic gasket 30 is interposed between the cylinder block and cylinder head, and the surface pressure is applied by tightening by the bolt, first, the highest rubber bead 24 is elastically deformed in a collapsing direction, and then the folded portions 21 and 22 are deformed in the collapsing direction, and by this deformation, the soft member 17 and the ring 31 are deformed. Since the ring 31 is of a wire shape, that is, has a substantially circular cross section, first, the ring 31 receives the surface pressure at a narrow area, however, as the ring 31 collapses gradually, the area which receives the surface pressure is increased.

Since the ring 31 is held in the inside of the folded portion 21, the collapsing property is gradually degraded. At this time, however, since a repulsive force has been generated in the folded portion 21, soft member 17 and ring 31, the sealing property with the joining surfaces of the cylinder block and cylinder head is ensured, and furthermore, this repulsive force makes the folded portion 21, soft member 17 and ring 31 deform following the deformation of the cylinder block and cylinder head to ensure the sealing property continuously.

On the other hand, since the ring 31 is held over the whole circumference of the cylinder bore 13, and the shim plate 36 is held between the adjacent cylinder bores 13, and the repulsive force is acting by the folded portion 32 against the tightening force by the bolt or the like, the surface pressure due to the tightening force tends to be uniformed over the whole metallic gasket 30 so that sufficient sealing property is ensured, in particular, at positions at which the surface pressure is weak as between the cylinder bore holes 13 and between the bolt holes 14.

Furthermore, since the plurality of holes 33 are formed, and the shim plate 35 is held by forming the folded portion 34 for each hole 33, the metallic gasket 30 is in contact with the cylinder block and cylinder head at not only the position around the cylinder bore hole 13 but at each folded portion 34. As a result, the surface pressure is not concentrated to only the position around the cylinder bore hole 13, and the deformation of the joining surfaces of the cylinder block and cylinder head is suppressed.

Figure 12A:
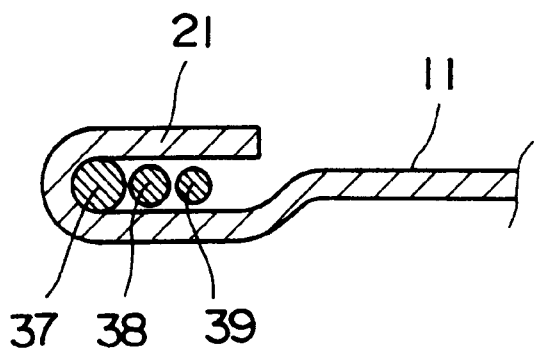
FIG. 12A a sectional view showing an example in which a plurality of rings are held inside the folded portion of the cylinder bore so that the diameter of the rings is sequentially decreased from the end portion of the folded portion.
Figure 12B:
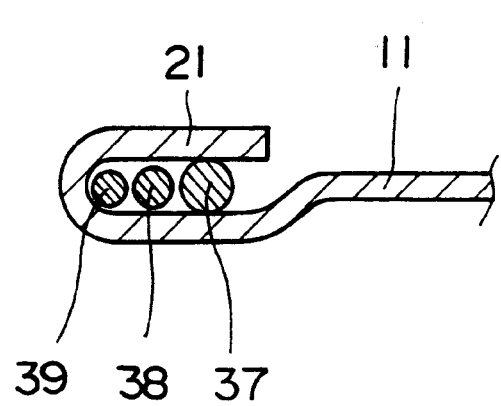
FIG. 12B is a sectional view showing an example in which a plurality of rings are held inside the folded portion of the cylinder bore so that the diameter of the rings is sequentially increased from the end portion of the folded portion.

Furthermore, as shown in FIGS. 12A and 12B, a plurality of rings 37, 38 and 39 of different diameters may be held in the inside of the folded portion 21 over the whole circumference of the cylinder bore hole 13. These rings 37, 38 and 39 are made of a wire-shaped soft metallic material similar to the ring 31.

When a high surface pressure is required at the end of the cylinder bore hole 13, as shown in FIG. 12A, the ring 37 having the largest diameter is held at the inner side of the folded portion 21, and the ring 38 having the next large diameter and the ring 39 having the smallest diameter are held in this order towards the outer side of the folded portion 21. In this arrangement, with respect to the tightening force by the bolt or the like, since the amount of collapse is the largest at the end of the cylinder bore hole 13, and the amount of collapse is reduced as a distance from the end is increased, the deformation of the rings 37, 38 and 39 is suitably proportional to the surface pressure, and a high surface pressure can be ensured at the end of the cylinder bore hole 13.

On the other hand, in an engine formed by press fitting a cast iron sleeve into a cylinder block made of aluminum, when a large load is applied to the end of the folded portion 21 of the cylinder bore hole 13, there is a possibility of causing a drawback that the cast iron sleeve is deformed with its edge rounded, and the roundness of the cylinder bore is degraded. Accordingly, in such a case, as shown in FIG. 12B, the ring 39 having the smallest diameter is held at the end of the folded portion 21, and the ring 38 having the larger diameter and the ring 37 having the largest diameter are held in this order towards the outer side of the folded portion 21. By this arrangement, the amount of collapse is larger at the position remote from the end than at the position near the end of the folded portion 21. As a result, the deformation of the rings 37, 38 and 39 is suitably proportional to the surface pressure, and the tightening surface pressure is averaged. Thus, the deformation of the cast iron sleeve with its edge rounded is prevented, and the roundness of the cylinder bore can be ensured.

In the metallic gaskets 10 and 30 of the present invention, since the gasket is formed of the single base plate 11, and the folded portions 21, 22, 32 and 34 are formed in the base plate 11, the number of metallic molds to be manufactured can be reduced, and the manufacturing costs including a material cost can be reduced significantly. Furthermore, since the rubber beads 24 can be easily formed by the dispenser method of one stroke, screen printing, mold type using a metallic mold, or the like, the metallic gasket can be manufactured very inexpensively.

In the metallic gaskets 10 and 30 as described above, when the gasket is interposed and tightened between the joining surfaces of the cylinder block and cylinder head, with respect to the deviation of the tightening forces, the folded portion 21 and the soft member 17 inside the folded portion 21 are suitably deformed following the deviation, and the surface pressure due to the tightening force is further uniformed by virtue of the deformation. Moreover, since the rubber beads 24 are also elastically deformed and the tightening force is further uniformed, the sufficient sealing effect can be ensured. As mentioned above, by achieving the avoidance of the deviation of the tightening forces and by ensuring the sufficient sealing effect, it is possible to prevent the occurrence of cracks and fractures in the metallic gasket due to the influence of vibration amplitude caused during operation of the engine, and to prevent the reduction of the service life of the metallic gasket due to the influence of combustion gas. For the whole engine, the fuel consumption is improved, and the service life is improved.

Figure 13:
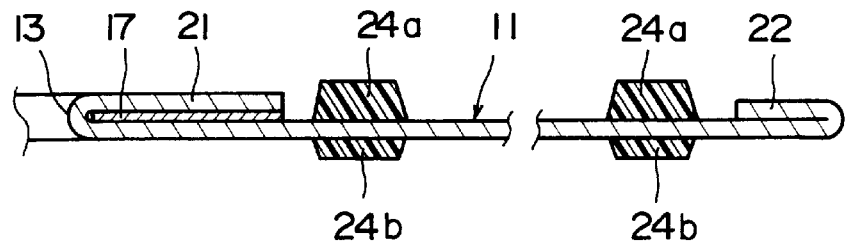
FIG. 13 is a sectional view showing another example of a metallic gask of the invention.

In this embodiment, the height of the upper joining surfaces of the folded portions 21, 22, 32 and 34 from the upper joining surface of the base plate 11 is made equal to the height of the lower joining surfaces of the folded portions 21, 22, 32 and 34 from the lower joining surface of the base plate 11 by forming the step portions 23 and 23. However, as shown in FIG. 13, instead of forming the step portions, the height of a rubber bead 24a may be made higher at the folded side of the folded portion 21, and the height of a rubber bead 24b may be made lower at the opposite side so that the height of the upper joining surface of the rubber bead 24a from the upper joining surface of the base plate 11 is equal to the height of the lower joining surface of the rubber bead 24b from the lower joining surface of the base plate 11.

Furthermore, since the folded portions 22 are formed on the outer periphery of the base plate 11, there is a possibility that the end portions of the folded portions 22 are not flattened completely. When the metallic gasket which is not flattened completely is interposed between the cylinder block and cylinder head, as will be easily predicted, the sealing property will be deteriorated at these end portions, and it will need an excessively large load to collapse and flatten the end portions, and at the same time, there is a possibility that spring back will be caused by collapsing by applying the load.

Figure 14A:
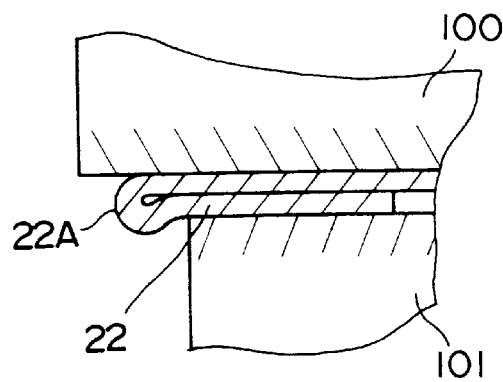
FIG. 14A is a sectional view in which the metallic gasket is interposed between the cylinder block and cylinder head so that the end portion of the folded portion is positioned outside of only a joining surface of the cylinder block.
Figure 14B:
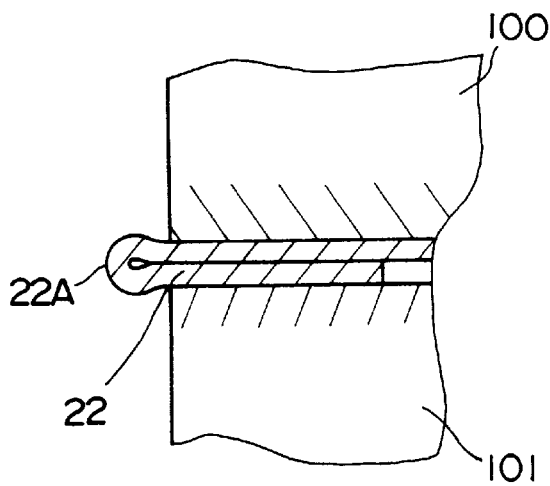
FIG. 14B is a sectional view in which the metallic gasket is interposed between the cylinder block and cylinder head so that the end portion of the folded portion is positioned outside of both joining surfaces of the cylinder block and cylinder head.

Accordingly, as shown in FIGS. 14A and 14B, when the end portion 22A of the folded portion 22 is positioned outside of at least one of the joining surfaces of the cylinder head 100 and cylinder block 101, the sealing property is not degraded and there is no need to apply the load to flatten the end portion. Furthermore, by virtue of this, an accurate gasket load can be calculated.

Figure 15:
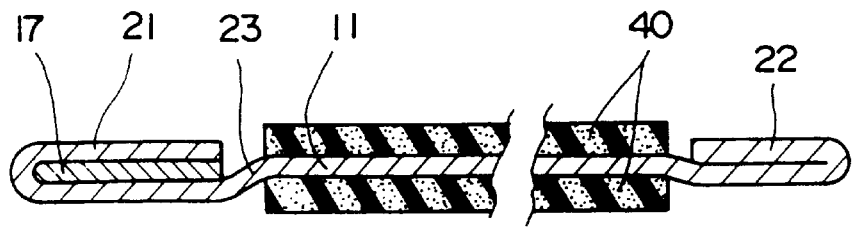
FIG. 15 is a sectional view showing an example in which foam rubber is attached to the base plate in one embodiment.

Furthermore, when the metallic gasket 10 or 30 is mounted on a water-cooled engine, as shown in FIG. 15, by coating foam rubber 40 on both joining surfaces of the base plate 11 except for the folded portions 21, 22, 32 and 34, the following advantage can be obtained. That is, in the water-cooled engine, the cooling water is circulated by a pump, and there is a trend that the water pressure is high near the pump and conversely, the water pressure is low at a remote position from the pump. For this reason, in a metallic gasket having the water holes 16 corresponding to the water jacket of the water-cooled engine, in the prior art, the adjustment of the water pressure has been achieved by changing the size of the water holes 16. However, when a base plate having a large plate thickness is used, a difference in thickness between the folded portions 21, 22, 32 and 34, and the single plate part of the base plate 11 is large, and a gap between the single plate part of the base plate 11 and the cylinder block or cylinder head is large. Thus, there is a possibility of shortcircuiting. Accordingly, when the metallic gasket is to be mounted on such the engine, by coating the foam rubber 40, the shortcircuit between the water holes 16 can be prevented without applying too large surface pressure.

Although it is not shown in the drawings, it is possible to achieve uniform surface pressure by partially increasing the width and thickness of the soft member 17 for the positions remote from the tightening members such bolts, the position between the cylinder bore holes 14, and a portion at which the number of oil holes 15 and water holes 16 is large. That is, since the repulsive force of the soft member 17 is increased by increasing the width and thickness, and conversely, the repulsive force is decreased by decreasing the width and thickness, if the the width and thickness of the soft member 17 is partially increased at a position of weak tightening force, the surface pressure is suitably uniformed.

Furthermore, when it is desired to form a metallic gasket having a large plate thickness, there is no need to stack a plurality of base plates 11, and this can be achieved by holding a soft member or a shim plate of a desired thickness in the inside of the folded portion which is in direct contact with the joining surface of the cylinder block or cylinder head, and by increasing the height of the rubber bead and metallic bead correspondingly.

Figure 16:
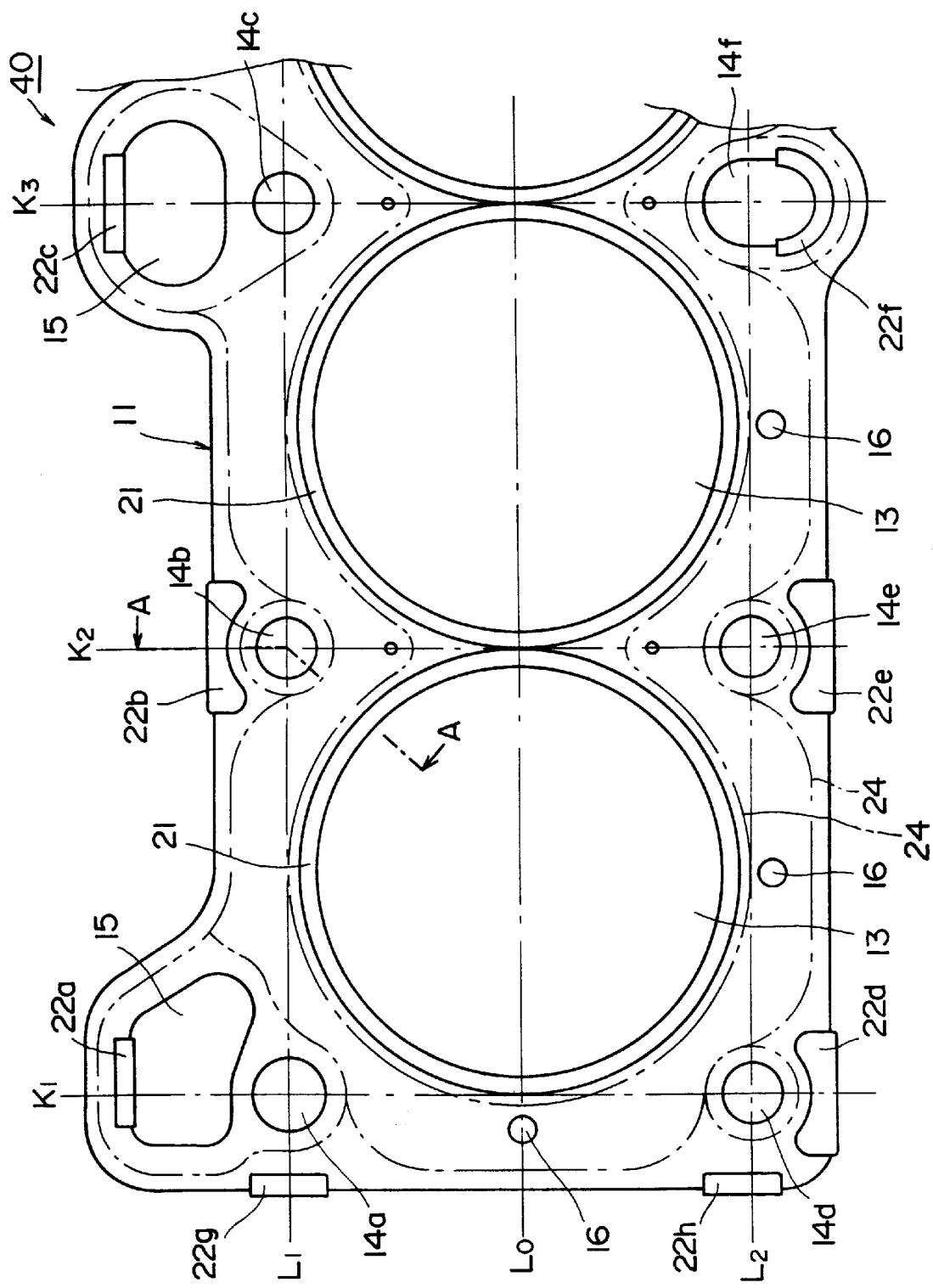
FIG. 16 is a plan view showing a structure of still another example of a metallic gasket of the present invention.

Another embodiment of the invention will be described with reference to FIGS. 16 and 17.

Referring to these figures, a metallic gasket 40 includes a base plate 11 made of metal such as stainless steel, and a plurality of holes are formed in the base plate 11. The base plate 11 has inner surface of each hole and both joining surfaces around each hole applied with plating such as metal plating, resin plating, or mixed plating of metal and resin, and furthermore, a surface treatment material 12 such as fluorine rubber, nitrile rubber (NBR), molybdenum disulfide, or the like is baked on the surfaces of the base plate 11 depending on finishing roughness of the joining surfaces of a cylinder block and a cylinder head which constitute an engine.

The plurality of holes include a plurality of cylinder bore holes 13 corresponding to cylinder bores (combustion chambers) of the cylinder block, bolt holes 14 (14a to 14f) corresponding to positions of tightening bolts for connecting the cylinder block and the cylinder head, oil holes 15 corresponding to oil galleries for supplying lubricating oil to each slidably moving part such as a piston (not shown) or the like, and water holes 16 positioned at an inside portion of a water jacket for supplying cooling water to the cylinder block and the cylinder head whose temperature rises due to combustion of fuel and the sliding motion of the piston. These holes 13 to 16 are in communication with respective parts of the engine when the metallic gasket 40 is interposed between the cylinder block and cylinder head to construct the engine.

Figure 17:
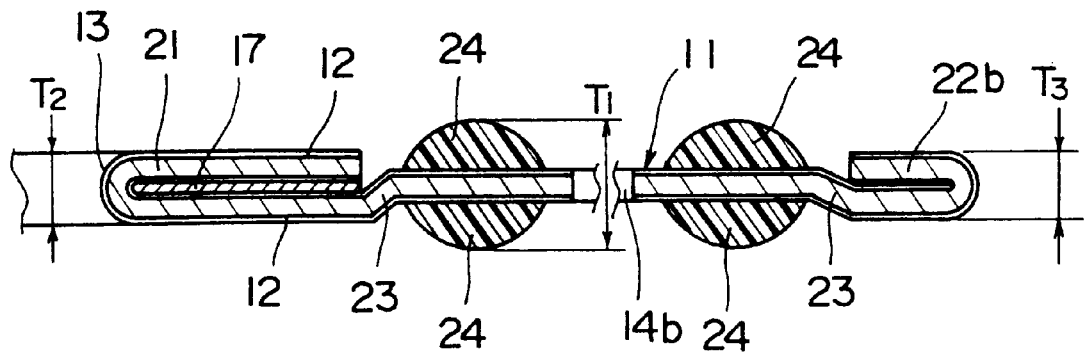
FIG. 17 is a sectional view taken along the line A—A in FIG. 16.

Among the holes 13 to 16, for the cylinder bore holes 13, an edge of the hole 13 of the base plate 11 is folded back to form a folded portion 21 as shown in FIG. 17, and a soft member 17 made of, for example, an expansible graphite sheet is held inside of the folded portion 21. The plate thickness of the soft member 17 is varied depending on the rigidity of the engine, and the larger the rigidity, the thinner becomes the thickness, however, about 0.3 mm is a standard thickness, and in this example, a soft member having a density of 1.0 is held inside and compressed by a pressure of 600 kg/cm$^2$ to compress and deform by about 30 to 50%. Furthermore, the soft member 17 is not limited to the expansible graphite sheet, but, for example, a soft metallic plate such as a lead plate, a zinc plate, a copper plate, a soft steel plate, or the like, or an ethylene 4-fluorine sheet (e.g. polyimide sheet), or mica may be used.

Supposing that a straight line passing through center points of adjacent cylinder bore holes 13 is expressed as a reference line L0, the center points of bolt holes 14a to 14c located on one side of the reference line L0 are on a straight line L1 which is in parallel with the reference line L0, and the center points of bolt holes 14d to 14f located on the other side of the reference line L0 are on a straight line L2 which is in parallel with the reference line L0. Furthermore, the center points of two bolt holes 14a and 14d opposing each other at the nearest distance at opposite sides of the reference line L0 are on a straight line K1 which is orthogonal to the reference line L0, and likewise, the center points of two bolt holes 14b and 14e are on a straight line K2 which is orthogonal to the reference line L0, and center points of two bolt holes 14c and 14f are on a straight line K3 which is orthogonal to the reference line L0. Here, each of the straight lines K1 to K3 is represented by a first bolt hole line, and each of the straight lines L1 and L2 is represented by a second bolt hole line.

An oil hole 15 is located between the bolt hole 14a on the straight line Ki and the outer peripheral edge of the base plate 11, and a part of the edge of the oil hole 15 along the straight line K1 and near the outer peripheral edge of the base plate 11 is folded back to the same joining surface side as the folded portion 21 of the cylinder bore hole 13 to form a folded portion 22a. A folded portion 22d is formed by tolding a part of the outer peripheral edge of the base plate 11 at an outer side of the bolt hole 14d on the straight line K2, and this part of the outer peripheral edge is folded back in the same joining surface side as the folded portion 21 of the cylinder bore hole 13.

At the outer sides of the bolt holes 14b and 14e on the straight line K2, there are formed with folded portions 22b and 22e by respectively folding back parts of the outer peripheral edge of the base plate 11 in the same joining surface side as the folded portion 21 of the cylinder bore hole 13.

Another oil hole 15 is located between the bolt hole 14c on the straight line K3 and the outer peripheral edge of the base plate 11, and a part of the edge of the oil hole 15 along the straight line K3 and near the outer peripheral edge of the base plate 11 is folded back to the same joining surface side as the folded portion 21 of the cylinder bore hole 13 to form a folded portion 22c. A folded portion 22f is formed in the bolt hole 14f (serving also as an oil hole) on the straight line K3 by folding an edge of the bolt hole 14f at the side of the outer peripheral edge of the base plate 11, and the edge of the bolt hole 14f is folded back in the same joining surface side as the folded portion 21 of the cylinder bore hole 13.

A folded portion 22g is formed by folding a part of the outer peripheral edge of the base plate 11 at a lateral outer side of each of opposite end bolt holes (the bolt hole 14a at the left end shown in FIG. 16 and a bolt hole at the right end not shown) on the straight line L1, and the folded portion 22g is formed by folding in the same joining surface side of the folded portion 21 of the cylinder bore hole 13. Likewise, a folded portion 22h is formed by folding a part of the outer peripheral edge of the base plate 11 at a lateral outer side of each of opposite end bolt holes on the straight line L2, and the folded portion 22h is formed by folding in the same joining surface side of the folded portion 21 of the cylinder bore hole 13.

These folded portions 22a to 22h correspond to the large thickness portions in the present invention, and all of the folded portions are formed by folding back an extra edge of the base plate 11 in which the extra edge is formed at the time of forming the base plate to protrude integrally with the main part of the base plate 11. These folded portions do not hold anything in the inside, and is merely folded.

The folded portions 21 and 22a to 22h have both joining surfaces coated with a lubricant such as molybdenum disulfide, graphite, or the like, and on the other hand, some flaws are formed in the inside surfaces of the folded portion 21.

The parts of the base plate 11 at which the folded portions 21 and 22 (22a to 22h) are formed protrude to one joining surface side as compared with the rest of the base plate 11. However, as shown in FIG. 17, step portions 23 are formed at boundary positions between the folded portions 21 and 22b and the rest of the base plate 11 so that the folded portions 21 and 22b are stepped down with respect to the rest of the base plate 11. As a result, the height of the upper surfaces of the folded portions 21 and 22b from the upper surface of the base plate 11 is equal to the height of the lower surfaces of the folded portions 21 and 22b from the lower surface of the base plate 11. At a position between adjacent cylinder bore holes 13, the step portion 23 is not formed because the spacing is narrow.

On the other hand, a rubber bead 24 made of, for example, silicon rubber is formed on each of both the joining surfaces of the base plate 11. The rubber bead 24 is formed around the cylinder bore hole 13 and around each bolt hole 14, and at the same time, to bound the cylinder bore holes 13, bolt holes 14, oil holes 15, and water holes 16. In FIG. 16, the locus of the rubber bead 24 is shown by a long and short dash line.

Further, as shown in FIG. 17, the rubber bead 24 has a cross section perpendicular to the joining surfaces in a semicircular shape, and at the same time, the rubber beads 24 on both joining surfaces are symmetrical. The shape of the cross section is not limited to the semicircular but it may be a trapezoidal shape, and the shape at the other positions may be different from that around the bolt hole 14. Furthermore, some irregularities or flaws may be formed beforehand on the base plate 11 at positions at which the rubber beads, 24 are to be formed so that the rubber beads 24 can be formed in a good state.

These rubber beads 24 are formed on both the joining surfaces of the base plate 11 so that the height of an upper peak of the rubber beads 24 from the upper joining surface of the folded portion 21 and 22b is equal to the height of a lower peak of the rubber beads 24 from the lower joining surface of the folded portion 21 and 22b, and in addition, a distance between the upper peak and the lower peak of the opposing rubber beads 24 is 1.5 times as large as the thickness of the folded portions 21 and 22. In this case, as regards the thickness of the metallic gasket 10, the relationship among the height of the opposing rubber beads 24 measured between the upper and lower peaks is represented by T1, the thickness of the folded portion 21 of the cylinder bore hole 13 is represented by T2, and the thickness of the folded portion 22 at the outer peripheral edge near the bolt hole 14 is represented by T3 is the same as described with reference to FIG. 4. The rubber bead 24 may be formed as described with reference to FIG. 4.

In this case, it is possible to form the rubber bead 24 on only one of the joining surfaces, and a metallic bead is formed on the other joining surface so that the metallic bead protrudes to this joining surface side. However, a metallic mold is necessary to form the metallic bead.

The metallic gasket 40 formed in this manner is designed, when it is interposed between the joining surfaces of the cylinder head and cylinder block, so that an area of a metallic surface (in practice, the surface treating material 12 is coated) which contacts the joining surface of the cylinder head or cylinder block is about 30% or less of the whole area of the metallic gasket 40. Such a design is intended to reduce as far as possible the absolute load which is applied when the metallic gasket 40 is interposed between the cylinder block and cylinder head, and tightened by tightening members such as bolts.

Next, the function of the metallic gasket 40 will be explained. When the metallic gasket 40 is interposed between the cylinder block and cylinder head, and tightened by tightening members such as bolts, the metallic gasket 40 is deformed in a collapsing direction due to surface pressure of the cylinder block and cylinder head caused by the tightening force. More specifically. the rubber bead 24 which is the highest is elastically deformed in the collapsing direction, and next, the folded portions 21 and 22 are deformed in the collapsing direction, and the soft member 17 is deformed by the deformation of the folded portion 21.

At this time, in the folded portion 21, supposing that the plate thickness of the soft member 17 is 0.3 mm, at a part of the soft member 17 near the bolt and a surface pressure is high, the soft member 17 is deformed by about 50% to have a thickness of about 0.15 mm, and at a part of the soft member 17 remote from the bolt and a surface pressure is low, for example, a position between adjacent cylinder bore holes 13, or a position between bolt holes 14, the thickness is reduced to about 0.18 to 0.20 mm. Thus, since the soft member 17 is deformed to have a thinner thickness at a part having a high surface pressure, and conversely, the soft member 17 is deformed to have a thicker thickness at a part having a low surface pressure as compared with the part having the high surface pressure, a sufficient sealing effect can be ensured.

Furthermore, if the width of the rubber bead 24 is reduced, the load required to deform will be decreased. Thus, this metallic gasket 40 can be adapted to further reduction of the rigidity of the cylinder head and cylinder block.

Figure 18:
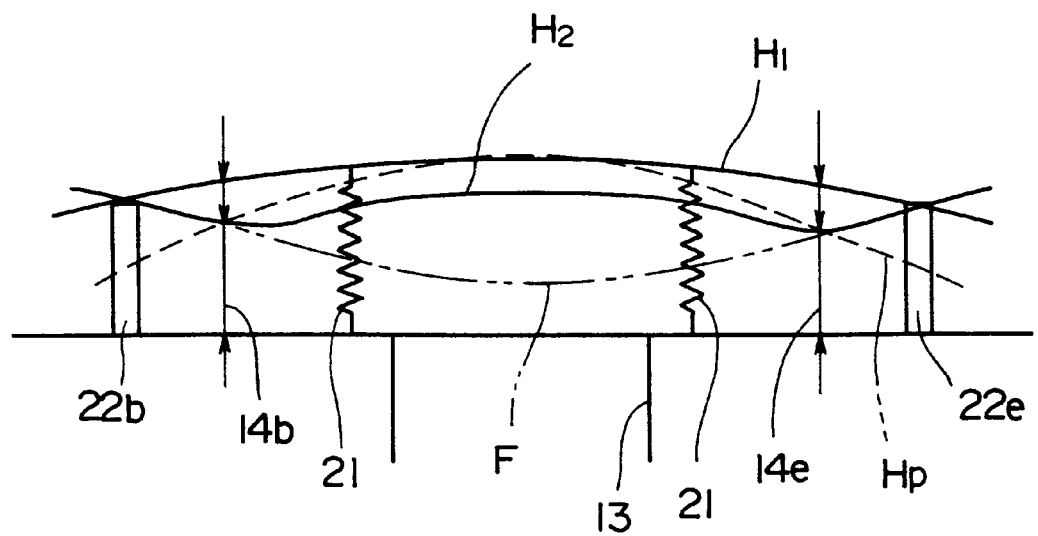
FIG. 18 a diagram corresponding to a cross section taken along the straight line K2 in FIG. 16 in which the effect caused by the provision of a large thickness portion is explained.

As regards the deformation of the cylinder head due to the tightening force, when considering as to the cross section along the straight line K2, as shown in the diagram of FIG. 18, the cylinder head is pressed against the folded portion 21 of the cylinder bore hole 13, and a part of the cylinder head between the bolt holes 14b and 14e is deformed to bend in a convex shape at the upper side as represented by the letter H1. Thereafter, the cylinder head contacts the folded portions 22b and 22e respectively located at outer sides of the bolt holes 14b and 14e. However, since the folded portions 22b and 22e do not hold the soft member, they are hardly deformed and support the deformation of the cylinder head.

When the tightening force is further increased, the folded portions 22b and 22e act as a counter, and a force F is generated which deforms the part of the cylinder head between the bolt holes 14b and 14e to bend in a convex shape at the lower side. Since this force F is generated in a direction to cancel the deformation H1 of the cylinder head caused by the contact of the folded portion 21 of the cylinder bore hole with the cylinder head, an actual deformation H2 of the cylinder head is small as compared with a deformation Hp in which the folded portions 22b and 22e are not formed as in the prior art.

Also as regards the cross sections along the straight lines K1 and K3, likewise, the deformation of the cylinder head is suppressed by the action of the folded portions 22a and 22d, and 22c and 22f located at the outer sides of corresponding bolt holes 14a and 14d, and 14c and 14f. Furthermore, as regards the cross sections along the straight lines L1 and L2, likewise, the deformation of the cylinder head is suppressed by the action of the folded portions 22g, and 22h located at the outer sides of corresponding bolt holes 14a, and 14d.

As described above, in this embodiment, since the folded portions (large thickness portions) 22 (22a to 22h) are formed at positions mentioned above on all the first and second bolt lines (K1 to K3 and L1 to L2), with respect to the tightening force by bolts, the surface pressures on the whole circumference of the cylinder bore hole 13 is made uniform, and the roundness of the cylinder bore hole 13 is ensured. Thus, the roundness of the cross section of the cylinder inner tube can be ensured. Also, as the engine as a whole, the fuel consumption is improved, the power loss is reduced, and the exhaust gas contamination is reduced.

Furthermore, in this embodiment, when the oil hole 15 is present between the bolt hole 14a and the outer peripheral edge of the base plate 11 along the bolt line such as the straight line Ki, and the bolt hole 14f also serves as an oil hole, the part of the edge of the oil hole 15, and of the bolt hole 14f is folded to form the folded portions 22a, 22c and 22f. However, even in such the case, a part of the outer peripheral edge of the base plate 11 may be folded to form the folded portion. In this respect, from the point of base plate material saving, it is advantageous to form the oil hole and the like in the base plate by retaining an extra edge portion intended to be folded as compared with to retain an outwardly extending extra portion intended to be folded to form the folded portion of the outer peripheral edge of the base plate 11. Thus, the former enables to save more cost.

Furthermore, in this embodiment, the step portion 23 is formed in the base plate 11 so that the height of the both joining surfaces of the folded portion 21, and of the folded portion 22 from the base plate 11 is made equal for each side of the base plate 11. As a result, the joining surfaces of the folded portion 21 and 22 are uniformly in contact with the cylinder block and cylinder head. Furthermore, since it is possible to make the height of the rubber bead 24 equal for each side of the base plate 11, the contact of the rubber bead 24 with the cylinder block and cylinder head is also uniformed. Moreover, the folded portions 21 and 22 are given with the spring property due to the formation of the step portion 23. Accordingly, the metallic gasket 40 is suitably deformed to follow the deformation of the cylinder block and cylinder head due to the tightening force and the thermal effect during operation, and the uniformity of the surface pressure is promoted.

Figure 19:
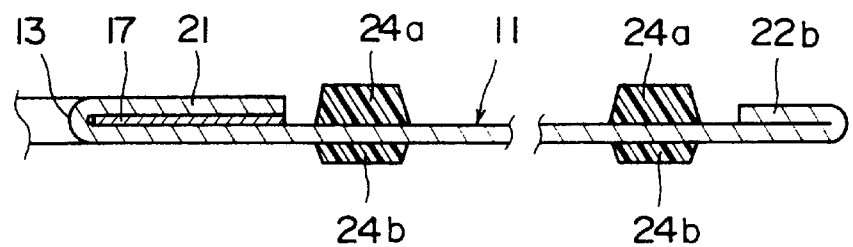
FIG. 19 is a sectional view corresponding to FIG. 3 except for the step portion is not formed.
Figure 20:
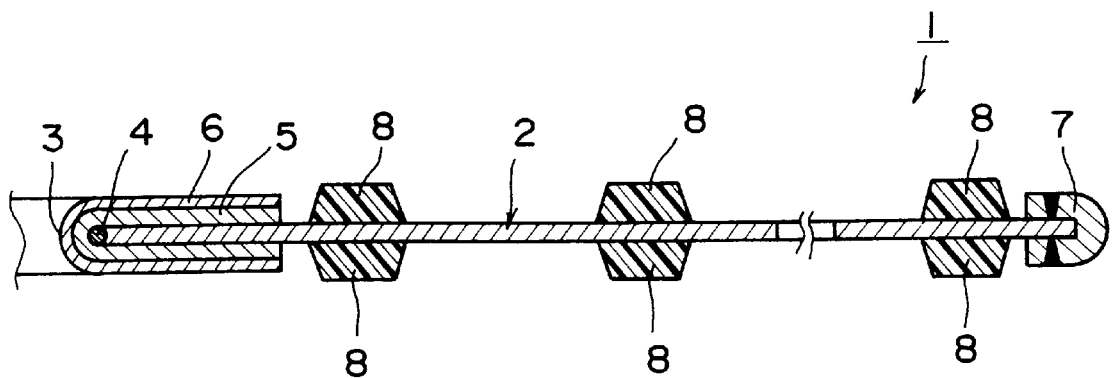
FIG. 20 is a sectional view showing a prior art metallic gasket.

The present invention includes a metallic gasket which is not formed with the step portion 23. Where the step portion 23 is not formed in the base plate 11, for example, as shown in FIG. 19, a rubber bead 24a on the side of the folded portion 21 and 22b is made thick and a rubber bead 24b on the other side is made thin so that the height of the upper rubber bead 24a from the upper joining surface of the folded portion 21 and 22b is made equal to the height of the lower rubber bead 24b from the lower joining surface of the folded portion 21 and 22b.

Furthermore, in the formation of the folded portion, in particular, in the folded portion 22 (22b, 22d, etc.) which is formed on the outer peripheral portion of the base plate 11, there may be a case wherein the end of the folded portion is not completely flat. If the metallic gasket having such a non-flat end folded portion is interposed between the cylinder block and cylinder head, as will be easily presumed, the sealing property will be degraded at this end portion. On the other hand, it requires an excessively large load to collapse and flatten the end portion, and when it is collapsed by applying the load, the spring back may possibly be caused. For example, if the plate thickness is 0.3 mm or larger, it is very difficult to collapse and flatten the end portion.

Accordingly, as shown in FIGS. 14A and 14B, the end portion 22A of the folded portion 22 is positioned outside of at least either one of the joining surfaces of the cylinder block 101 and cylinder head 100. Then, the sealing property will not be degraded, and there will be no need to apply the load to flatten the end portion. Furthermore, by such an arrangement, an accurate gasket load can be calculated.

In this embodiment, all of the large thickness portions are folded portions 22 which are formed by folding the edge of the base plate 11, that is, by folding the protruded extra edge portion which is integral with the base plate and intended to be folded, and which is formed at the time of preparing the base plate. Accordingly, the formation of the large thickness portions is easy. However, the present invention is not limited to this, and if it is impossible to form the folded portions in view of the design requirement, the large thickness portions may be formed by attaching a shim plate at the corresponding position.

In the case of forming the large thickness portions by attaching a plate material separate from the base plate at the outer periphery of the base plate, small plate materials may be fixed to respective positions along the first and second bolt lines. However, the formation of the large thickness portions is easier when a large integral plate material corresponding to the whole outer peripheral edge of the base plate is fixed to make the whole outer peripheral edge of the base plate as the large thickness portion. This also increases the counter effect of the large thickness portion.

Furthermore, in this embodiment, for example, as the folded portions 22a and 22d, when the distances of the folded portions 22a and 22d from the reference line L0 are different, it is preferable to insert a shim plate or the like into the folded portion 22a which is far, so as to increase the thickness, so that equivalent counter effects are obtained by both the folded portions 22a and 22d. Furthermore, in order to achieve the equivalent counter effects, it is only necessary to make the ratio of the above-mentioned distance to the thickness of the large thickness portion except for the base plate equal for each of both the large thickness portions.

As is the case of the folded portions 22a and 22c, when the oil holes 15 are formed at the outer sides of the bolt holes 14a and 14c, in addition to the folded portions 22a and 22c, further folded portions (not shown) may be formed at the edges of the oil holes 15 at the sides of the bolt holes 14a and 14c. Alternatively, a shim plate may be secured at the corresponding position to form the large thickness portion. In other words, the large thickness portions formed along one bolt hole line is not limited to two but three or more may be formed.

Furthermore, in this embodiment, all the large thickness portions (folded portions) are formed at the predetermined positions on the first and second bolt hole lines. However, the present invention includes the case wherein a part of the large thickness portion is formed at each of the predetermined positions on the first and second bolt hole lines. Also in this case, the deformation of the cylinder head is partially suppressed, and thus, as compared with the prior art, the surface pressure around the cylinder bore hole is uniformed, and the roundness of the cylinder bore hole can be improved.

What is claimed is:

1. A metallic gasket interposed between joining surfaces of a cylinder block and a cylinder head for sealing between said joining surfaces, comprising:
    a single base plate made of metal having at least a combustion chamber hole formed therein, the single base plate having an outer peripheral edge;
    a first folded portion of the base plate formed by folding an edge of the combustion chamber hole back onto the base plate;
    a soft member held inside the first folded portion of the base plate;
    a bead made of a rubber material formed on at least one joining surface of the base plate and located spaced from a hole so that a height of the bead is higher than that of the first folded portion; and
    a second folded portion formed at a position within a joining area of the base plate, the second folded portion being formed by folding back a predetermined portion of the base plate outer peripheral edge, the second folded portion having a height lower than that of the first folded portion.

2. The metallic gasket of claim 1, further comprising step portion formed in the base plate so that a height of one joining surface of the first folded portion from one joining surface of the base plate is substantially equal to a height of the other joining surface of the first folded portion from the other joining surface of the base plate.

3. The metallic gasket of claim 1, further comprising:
    a single base plate made of metal having at least a combustion chamber hole formed therein;
    a folded portion of the base plate formed by folding an edge of the combustion chamber hole back onto the base plate;
    a soft member held inside the folded portion of the base plate;
    a bead made of a rubber material formed on at least one joining surface of the base plate and located space from a hole so that a height of the bead is higher than that of the folded portion; and a high surface pressure-resistant and smoothness-increasing lubricant applied on the joining surfaces of the first folded portion.

4. The metallic gasket of claim 1, wherein the edge of the base plate which has been folded back to form the first folded portion is further bent towards the base plate.

5. The metallic gasket
    wherein inner surfaces of the first folded portion are made to be high frictional resistance surfaces having a high frictional resistance.

* * * * *